(12) United States Patent
Slungare

(10) Patent No.: US 10,336,216 B2
(45) Date of Patent: *Jul. 2, 2019

(54) VEHICLE ACCESS SEATING

(71) Applicant: Bruno Independent Living Aids, Inc., Oconomowoc, WI (US)

(72) Inventor: Hans Bertil Slungare, Grabo (SE)

(73) Assignee: Autoadapt AB, Stenkullen (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/315,043

(22) PCT Filed: May 29, 2015

(86) PCT No.: PCT/US2015/033196
§ 371 (c)(1),
(2) Date: Nov. 30, 2016

(87) PCT Pub. No.: WO2015/184267
PCT Pub. Date: Dec. 3, 2015

(65) Prior Publication Data
US 2017/0120776 A1     May 4, 2017

Related U.S. Application Data

(60) Provisional application No. 62/005,566, filed on May 30, 2014.

(51) Int. Cl.
*B60N 2/14* (2006.01)
*B60N 2/06* (2006.01)
(Continued)

(52) U.S. Cl.
CPC ................ *B60N 2/14* (2013.01); *B60N 2/06* (2013.01); *B60N 2/245* (2013.01); *B62D 25/04* (2013.01)

(58) Field of Classification Search
CPC . B60N 2/14; B60N 2/06; B60N 2/245; B62D 25/04
See application file for complete search history.

(56) References Cited

U.S. PATENT DOCUMENTS

| 8,936,295 B2 * | 1/2015 | Slungare | B60N 2/14 296/65.12 |
| 9,415,703 B2 * | 8/2016 | Slungare | B60N 2/14 |

(Continued)

FOREIGN PATENT DOCUMENTS

| CA | 2794277 A1 | 5/2013 |
| EP | 0972671 A1 | 1/2000 |
| FR | 2486787 A1 | 1/1982 |

OTHER PUBLICATIONS

Notification of Transmittal of the International Search Report and the Written Opinion of the International Searching Authority, or the Declaration issued in International Application No. PCT/US15/33196 dated Oct. 29, 2015, 12 pages.

(Continued)

*Primary Examiner* — Philip F Gabler
(74) *Attorney, Agent, or Firm* — Ryan O. White; Taft Stettinius & Hollister LLP

(57) ABSTRACT

Vehicle access seating supports a user seat unit using a mounting assembly, a fore-aft slide assembly, a swivel assembly and an extension/retraction assembly. The seat unit moves from a secured drive position on either side of the motor vehicle to an access position wherein at least part of the seat is outside the vehicle, facilitating user vehicle access. Moving from the drive position to the access position, the seat moves linearly along two axes—one (static) defined by the mounting assembly, and a second axis (pivotable) defined by the seat itself—increasing the seat occupant's legroom by reducing the clearances between the seat and the vehicle B-pillar and between the seat and the vehicle (Continued)

transmission tunnel. A vertical mounting recline angle improves the occupant headroom inside the vehicle. Moving between the drive and access positions, the seat can move through a narrow transition corridor in the motor vehicle.

18 Claims, 26 Drawing Sheets

(51) Int. Cl.
  *B60N 2/24* (2006.01)
  *B62D 25/04* (2006.01)

(56) References Cited

U.S. PATENT DOCUMENTS

| | | | |
|---|---|---|---|
| 2001/0038223 A1 | 11/2001 | Suga et al. | |
| 2007/0252424 A1* | 11/2007 | Tomaiwa | B60N 2/0232 297/463.1 |
| 2007/0284905 A1* | 12/2007 | Bailey | B60N 2/0232 296/65.07 |
| 2008/0185229 A1 | 8/2008 | Panzarella et al. | |
| 2008/0224522 A1 | 9/2008 | Taguchi et al. | |
| 2010/0007165 A1* | 1/2010 | Kusanagi | B60N 2/045 296/65.07 |
| 2010/0052392 A1* | 3/2010 | Lung | B60N 2/06 297/344.24 |
| 2013/0113258 A1* | 5/2013 | Slungare | B60N 2/14 297/344.21 |
| 2014/0138997 A1* | 5/2014 | Schulz | B60N 2/0244 297/344.24 |

OTHER PUBLICATIONS

Supplementary European Search Report for European Application No. EP15799062.3 dated Feb. 9, 2018, ( pages).

\* cited by examiner

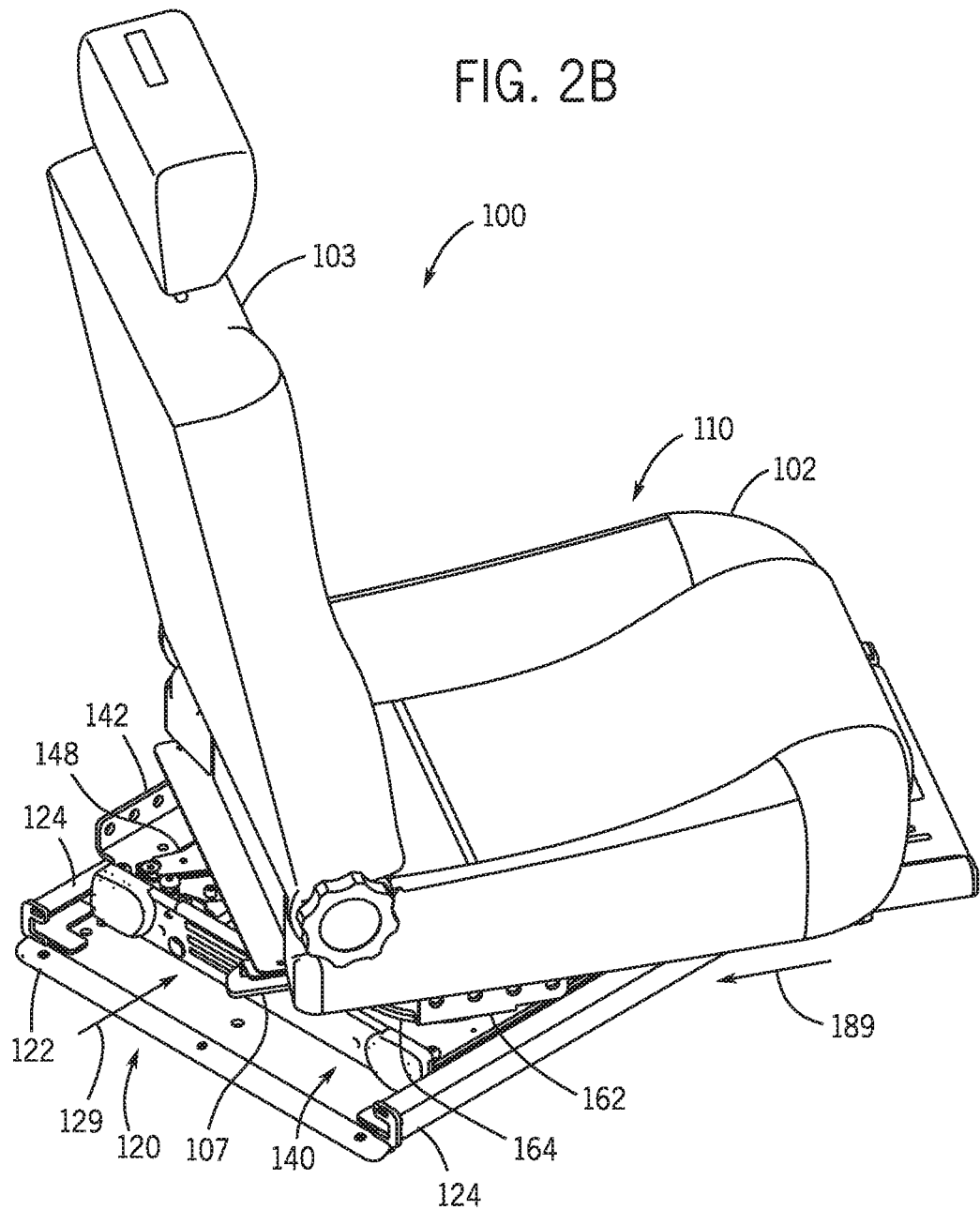

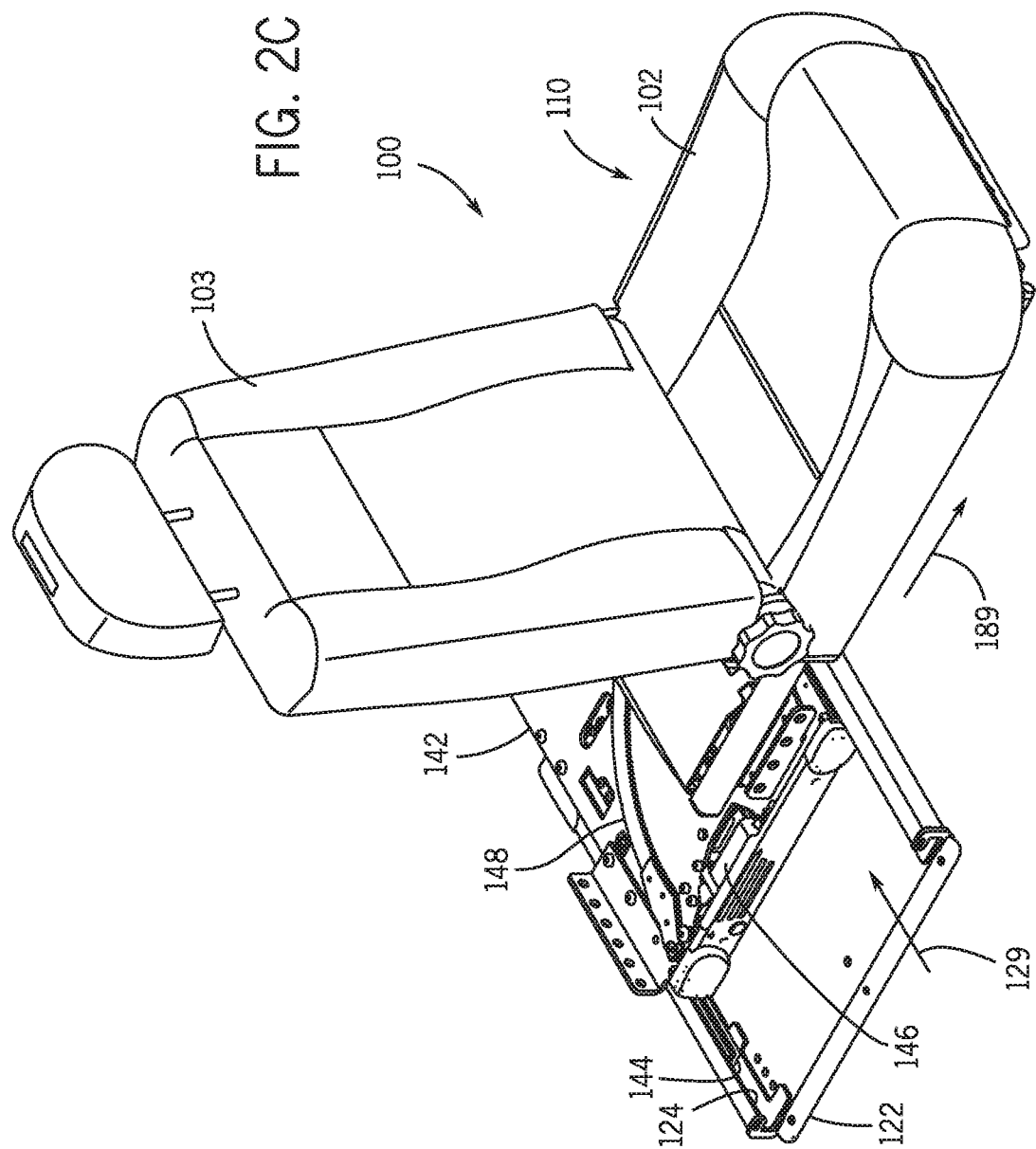

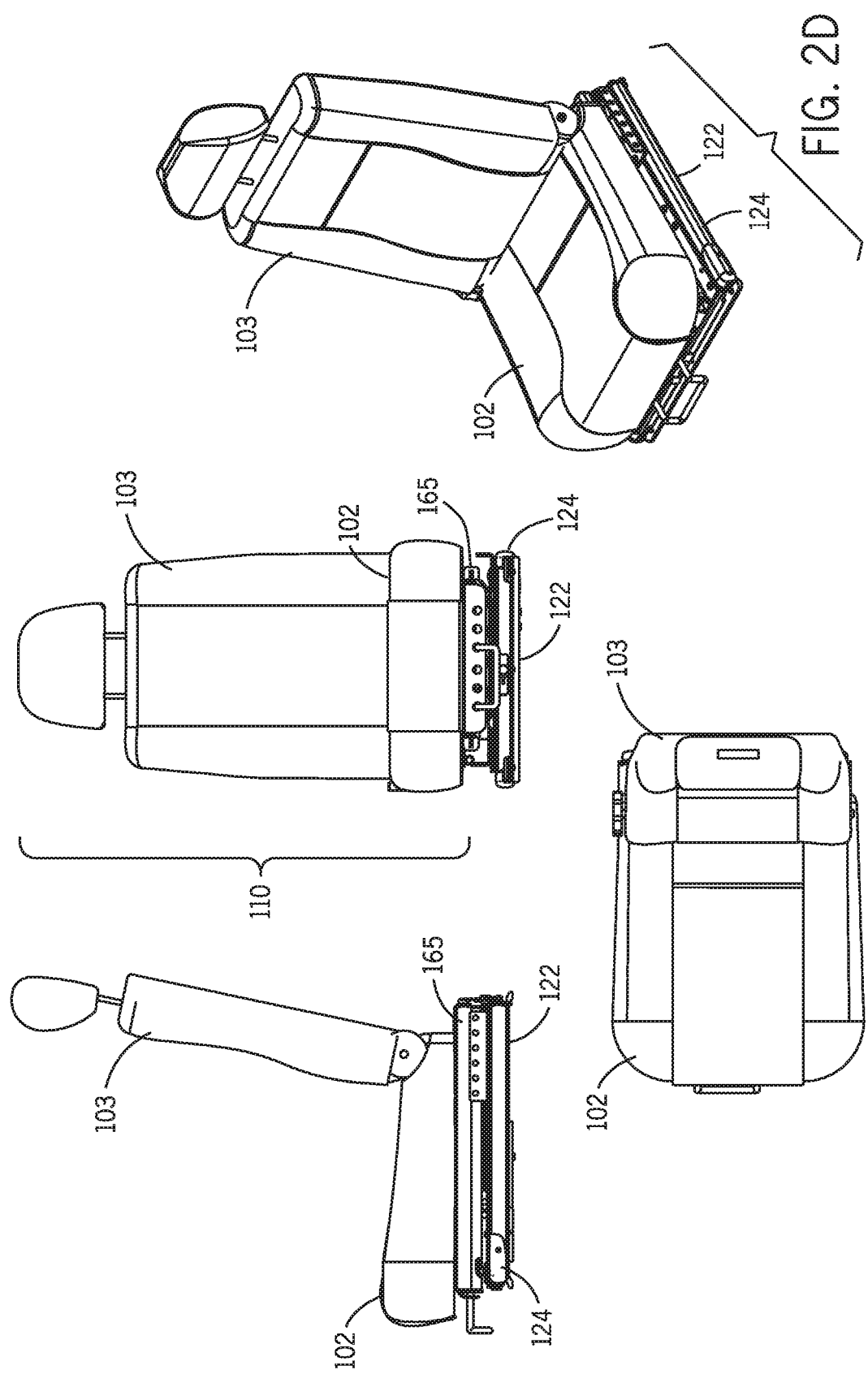

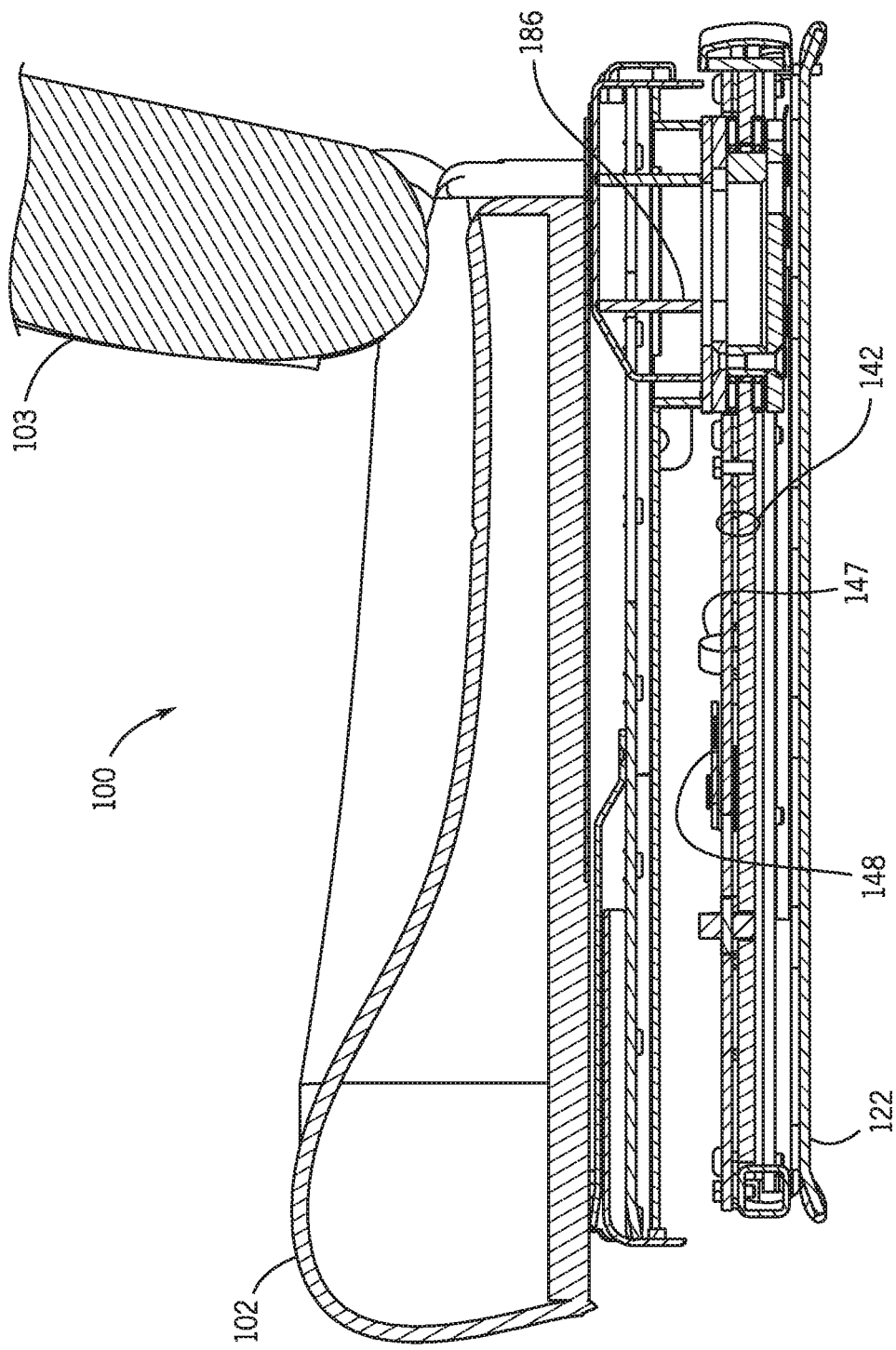

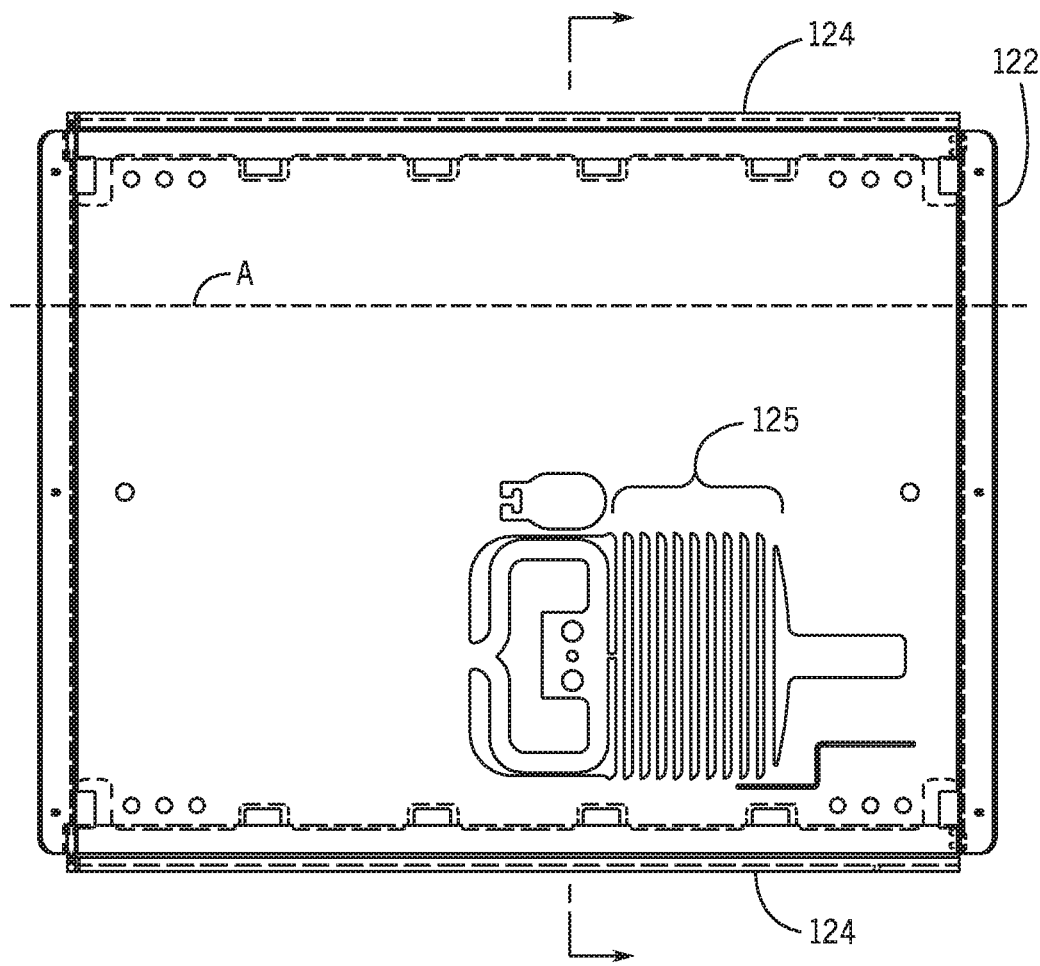
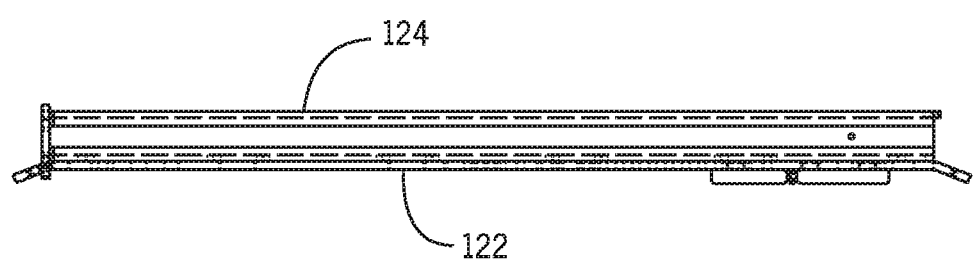
FIG. 5A

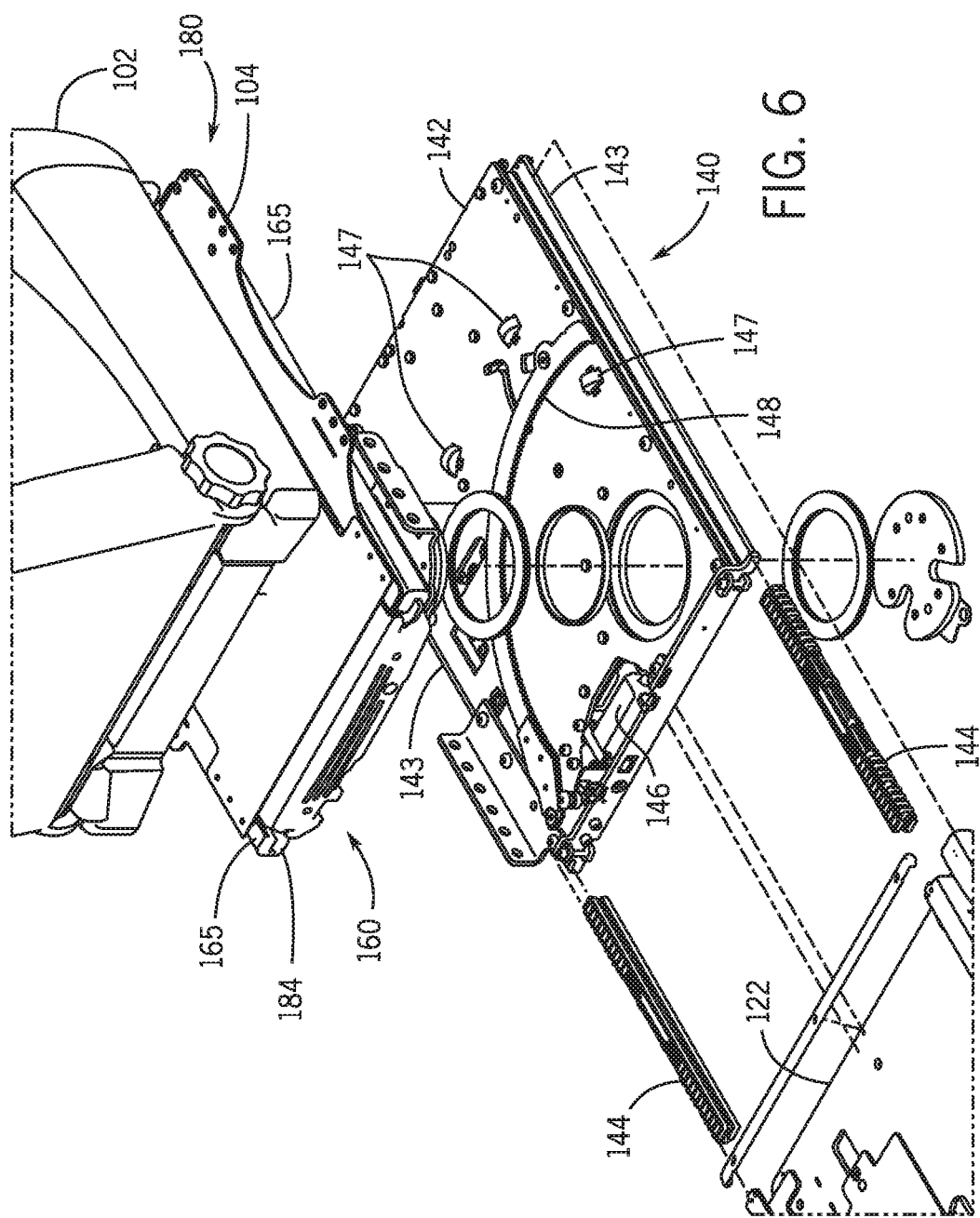

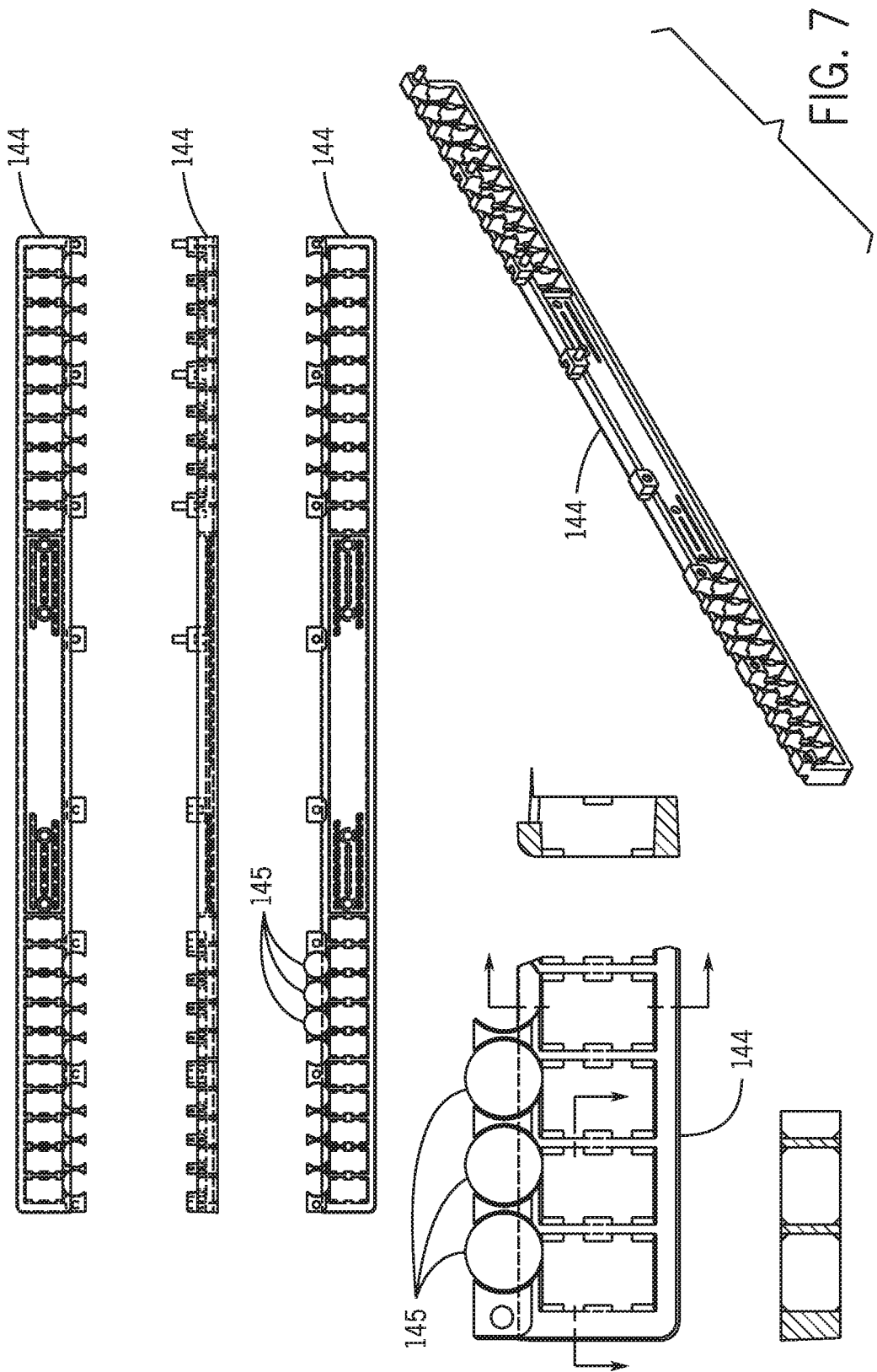

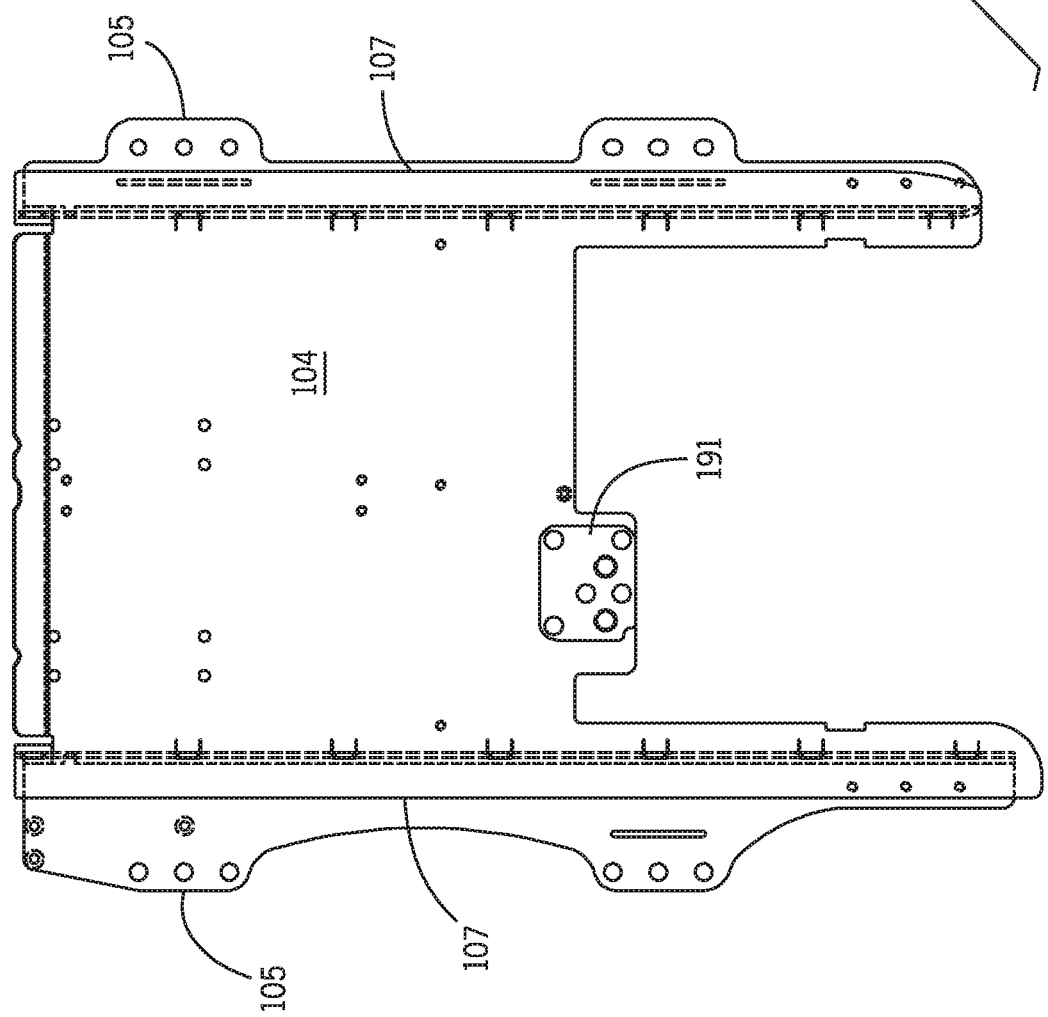
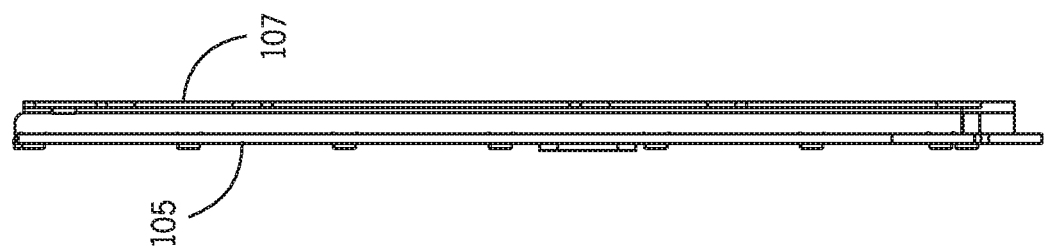
FIG. 14B

VEHICLE ACCESS SEATING

RELATED APPLICATIONS

This application is a United States national stage application under 35 U.S.C. § 371 and claims the benefit of International Application No. PCT/US2015/033196, filed May 29, 2015, which claims the benefit of and priority to U.S. Provisional Application No. 62/005,566, filed May 30, 2014, both of which are hereby incorporated by reference in their entireties, including all addenda thereto, for all purposes.

TECHNICAL FIELD

Aspects of the disclosure relate generally to apparatus, systems, methods, techniques, etc. for implementing seating systems that permit movement of a motor vehicle passenger or driver from an interior seat position (e.g., a driving position behind the motor vehicle steering wheel, or a passenger seat position) to an access position that is at least partially outside the motor vehicle and that permits mounting and dismounting of the seat, especially for someone of limited physical ability.

TECHNICAL BACKGROUND

Motor vehicles can have seats, seating assemblies, seating structures, etc. (referred to collectively at times herein as "seating systems") either originally installed or retrofitted to address mobility and other issues for drivers and passengers. Some of these seating systems are manual (i.e., operated by the seat occupant or another person without powered assistance) and some are powered in the sense that one or more electric motors, actuators and/or the like are used to move one or more components of a given seating system. Previous seating systems have been limited in several ways. A common and simple solution in these earlier systems is based on two sub-systems or members including a lower base attached in a fixed position to the motor vehicle floor pan and a top base (with an attached user seat) attached to the lower base via a swivel, allowing the top base to rotate outward or inward relative to the motor vehicle to facilitate ingress and egress. Such a solution can be manually operated (e.g. with a lever or the like), but also can be powered and operated by a switch, a pendant or the like.

Another solution is based on integrated movement of three sub-systems or members, including a lower base fixed to the motor vehicle floor pan. A middle base is attached to the lower base via rails, and allows forward linear movement parallel to a motor vehicle longitudinal axis during outward rotation of the user seat and rearward linear movement parallel to the motor vehicle longitudinal axis during inward rotation of the user seat to improve the occupant's rotation position relative to the B-pillar of the motor vehicle. A top base (with an attached user seat) is attached to the middle base via a swivel, allowing the top base to rotate outward or inward relative to the motor vehicle for ingress and egress. This 3-member solution can be manually operated (e.g., with a lever or the like), or can be powered. Apparatus, systems, methods, techniques, etc. that provide improved seating systems, especially with regard to a motor vehicle occupant's head room, knee room and comfort, would represent a significant advancement in the art.

OVERVIEW

Systems, methods and apparatus for vehicle access seating include assemblies supporting a user seat—e.g., some implementations include a mounting assembly, a fore-aft slide assembly, a swivel assembly and an extension/retraction assembly, which are driven and/or powered by a drive package that can include one or more motors, engines, actuators or the like for causing components, assemblies, etc. to move relative to one another. The mounting assembly can be attached in a fixed position to an interface layer secured to motor vehicle and has linear side edge guides. A mounting assembly adapter plate having a static axis A can be mounted parallel to or at a horizontal angular offset to a motor vehicle transmission tunnel (i.e., the longitudinal axis of the motor vehicle). A fore-aft slide assembly is mounted to the mounting assembly to allow linear movement parallel to the axis A using side edges and side edge guides to position the user seat's prior to starting rotation of the seat about the motor vehicle B-pillar. An extension/retraction slide assembly is mounted to the fore-aft slide assembly via a swivel assembly that allows controlled rotation of the user seat unit. The extension/retraction slide assembly engages the swivel assembly using a mechanism employing side edges and side edge guides to permit linear movement of the seat unit parallel to a seat pan axis S that pivots as the swivel assembly rotates the user seat unit. Using the linear movement along the axes A and S, combined with rotation, an occupant's position relative to a motor vehicle interior (e.g., the dashboard and A-pillar of the motor vehicle) can be optimized for comfort and legroom.

Embodiments of this vehicle access seating system allow for all functions to be electrically powered and further allow the best of path of travel to either be programmed or to be determined based on sensor data during operation. The reclined installation plane utilized in some implementations allows for more occupant headroom while using the OEM seating location. Twisting (horizontal angular offset) of the interface layer also permits the user seat to move closer to the doorway while the seat powers forward, making rotation more efficient and making it easier for the occupant's head to clear the motor vehicle roofline. Finally, the linear motion that moves the seat pan along the seat axis S likewise helps with optimizing seat transitioning between the drive and access positions, the combination of two types of linear motion coupled with rotation on an off-center rotation axis allowing for a multiple-axis movement.

The user seat is moved from a secured "drive position" or other standard interior motor vehicle seat position to an "access position" outside the motor vehicle, facilitating access for a user having limited mobility, strength, etc. Moreover, some embodiments of the vehicle access seating system include the use of motors to drive and control one or more of the above-referenced assemblies, wherein the motor(s) can be operated manually in situations where there is a power failure and/or other failure that prevents powered operation of the articulated seating system, thus allowing securing of the user seat in a position that permits continued use of the motor vehicle despite the seating system power and/or other failure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple implementations are described in connection with these drawings, the disclosure is not limited to the implementations disclosed herein. On the contrary, the intent is to cover all alternatives, modifications, and equivalents.

FIGS. 2A-2D are various views of one or more implementations of a vehicle access seating system in different positions during extension and retraction of the user seat to permit occupant egress and ingress in a motor vehicle.

FIGS. 3A-3D are cross-sectional views of one or more implementations of a vehicle access seating system.

FIGS. 5A-5B are various views of all or part of a mounting assembly for one or more implementations of a vehicle access seating system.

FIGS. 6, 12 and 15 are a detailed exploded view of one or more implementations of a vehicle access seating system.

FIGS. 7-8 are various views of a roller bearing guide usable with a vehicle access seating system.

FIGS. 14A-14B are various views of all or part of an extension/retraction assembly for one or more implementations of a vehicle access seating system.

DETAILED DESCRIPTION

Figure 1A:
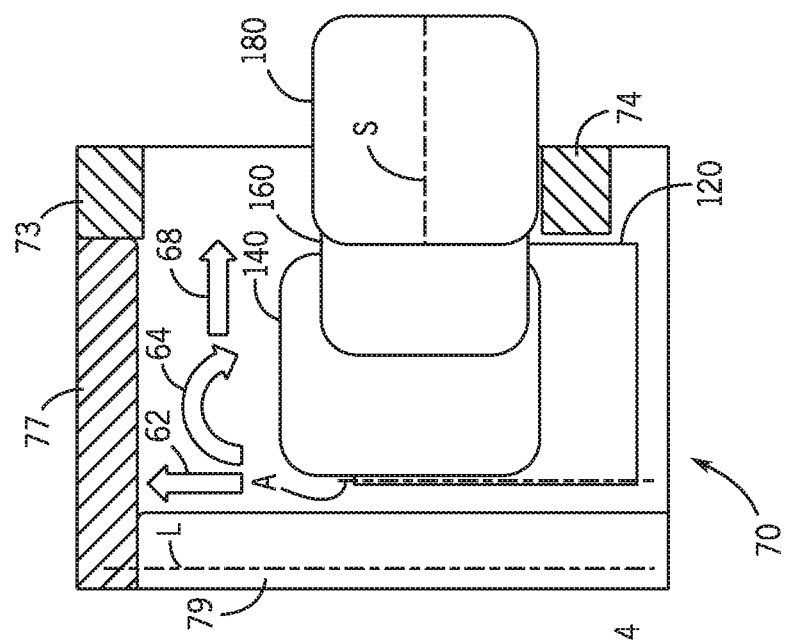
FIGS. 1A-1F are plan views of one or more implementations of a vehicle access seating system.

The following detailed description, including the Figures, will refer to one or more invention implementations, but is not limited to such implementations. Rather, the detailed description is intended only to be illustrative. Those skilled in the art will readily appreciate that the detailed description given with respect to the Figures is provided for explanatory purposes as the invention extends beyond such specific implementations. Implementations of the invention provide apparatus, systems, methods, techniques, etc. including and pertaining to (but not limited to) articulated seating systems including vehicle access seating systems for and/or in motor vehicles and the like. Other structures and uses will be apparent to those skilled in the art after considering the following disclosure and the Figures provided herewith. Some implementations may be used in connection with a driver's side seating system secured to the interior of a motor vehicle and some implementations may be used in connection with other seating positions (e.g., passenger seating positions) in a motor vehicle or the like.

Earlier configurations of such seats have imposed certain limitations on their installation and use. For example, when a seat swivel base is installed using a modified OEM seat, that installation typically increases the height of the vehicle seat when it is in its "drive position" (i.e., when it is in its interior locked position that permits normal operation of the motor vehicle, whether on the driver's side or on the passenger side of the vehicle, in which the user seat is in a generally forward-facing orientation in the motor vehicle seat location), thus limiting the clearance space between an occupant's head and the vehicle's interior roofline (i.e., "headroom"). In some instances this repositioning of the seat height creates a configuration outside a motor vehicle manufacturer's threshold(s) for crashworthiness. When this occurs, it is not uncommon to replace the OEM seat with a low-profile (e.g., aftermarket) seat to reduce the seat height.

Another issue arises in earlier seat configurations with respect to the occupant's knee room and legroom more generally. When the vehicle seat is rotated outward or inward, it is important to get as much occupant knee room as possible, especially for physically challenged individuals such as those with limited mobility (e.g., older individuals, physically challenged individuals). This limits how far forward (terms such as "forward" and "rearward" are relative to the motor vehicle's front and rear) the swivel installation should be situated. Likewise, the seat cannot be placed too far rearward because, for example with respect to a front driver or passenger seat configuration, the seat and its occupant also need to be able to clear the motor vehicle B-pillar as the seat moves into and out of the motor vehicle. The "least rearward" position possible or available in connection with earlier access seat configurations has been slightly forward of a normal OEM seat.

One solution to these limitations is an articulated seating system that is the subject of U.S. Publication No. 2013/0113258 A1, published May 9, 2013, which is incorporated herein by reference in its entirety for all purposes. In implementations of that invention, the swivel base moves forward while rotating, thus permitting movement that is close to the B-pillar.

As noted in this disclosure, when installed in a motor vehicle 70, vehicle access seating implementations can be viewed as a "stack" of assemblies that can include, from lowermost to uppermost—a mounting assembly, a fore-aft slide assembly, a swivel assembly and an extension/retraction assembly (which includes the user seat unit)—illustrative examples are shown respectively as assemblies 120, 140, 160 and 180 in FIGS. 1A-1F. These assemblies can be operated by one or more motors or the like, and such motors coordinate movement of the user seat unit to increase legroom for a seat occupant by reducing or minimizing the clearance between the user seat and a motor vehicle B-pillar and by reducing or minimizing the clearance between the user seat and a motor vehicle transmission tunnel.

More particularly, vehicle access seating implementations providing improved occupant knee room (or legroom generally) that are shown generally in FIGS. 1A through 1F include a mounting assembly 120 (also referred to as an "adapter plate assembly") configured to be secured to the interior of a motor vehicle 70 in approximately the same location and position as an OEM motor vehicle seat mounting (i.e., a motor vehicle internal seat position adjacent to a motor vehicle door).

Figure 1B:
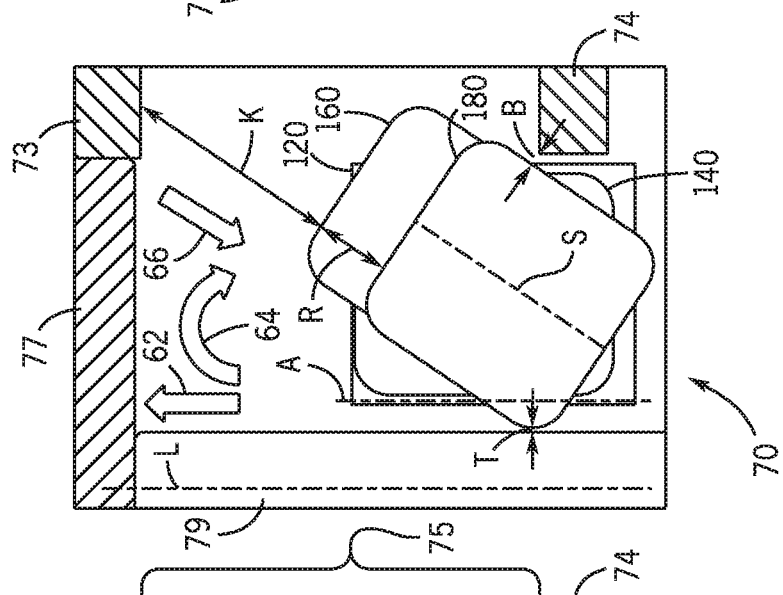
Figure 1C:
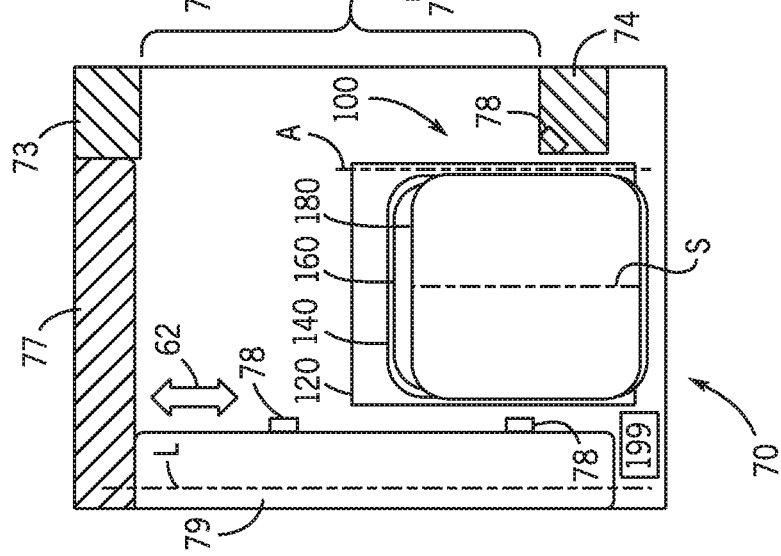

In FIGS. 1A to 1C, the mounting assembly 120 is mounted generally parallel to the motor vehicle transmission tunnel 79 and motor vehicle longitudinal axis L. Alternatively, in FIGS. 1D to 1F, the mounting assembly 120 is mounted at a horizontal offset (or "twist") angle $\Psi$ of ~1° (±1°)to the motor vehicle transmission tunnel 79 and vehicle axis L. In some situations, this horizontal angular offset $\Psi$ of one or more of the lower assemblies of the seating system 100 allows the footprint of system 100 to better match the floor space in motor vehicle 70. In some implementations the seating system 100 can be ~900 mm long, meaning that a 1° turn of the system's base creates 16 mm of additional space on the sides. Moreover, the 1° offset can be nominal and long mounting holes in some brackets of the seating system 100 implementations may allow for an additional 1° of twist (i.e., 2° total), meaning that installation of the system 100 can actually provide closer to 32 mm or approximately 1.25 inches of extra space, thus allowing for installation in a wider variety of motor vehicles.

Figure 1F:
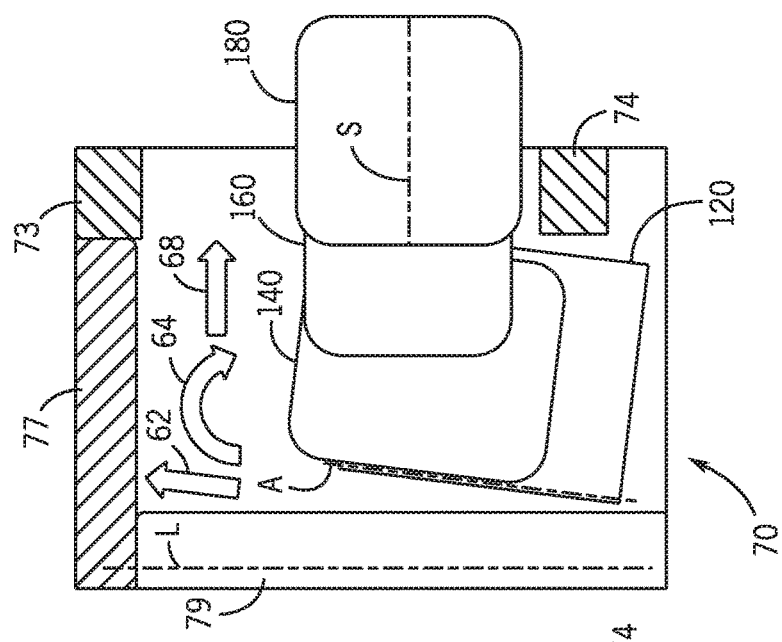
Figure 1E:
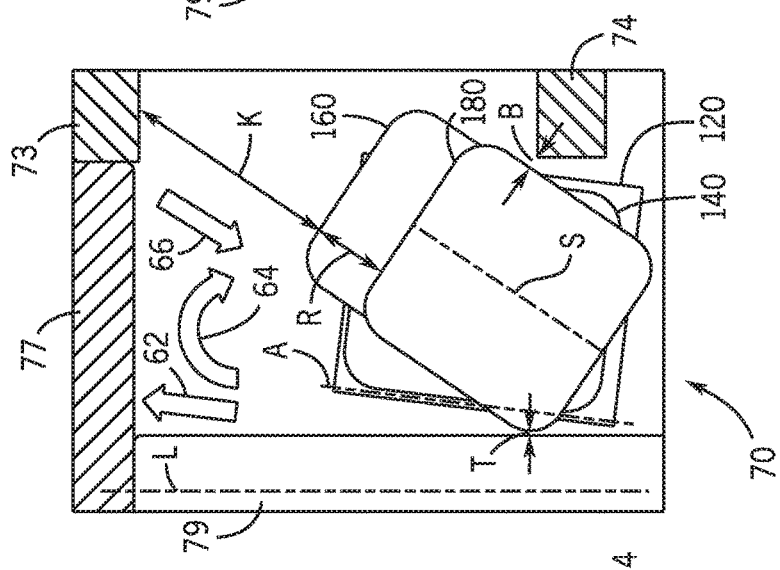
Figure 1D:
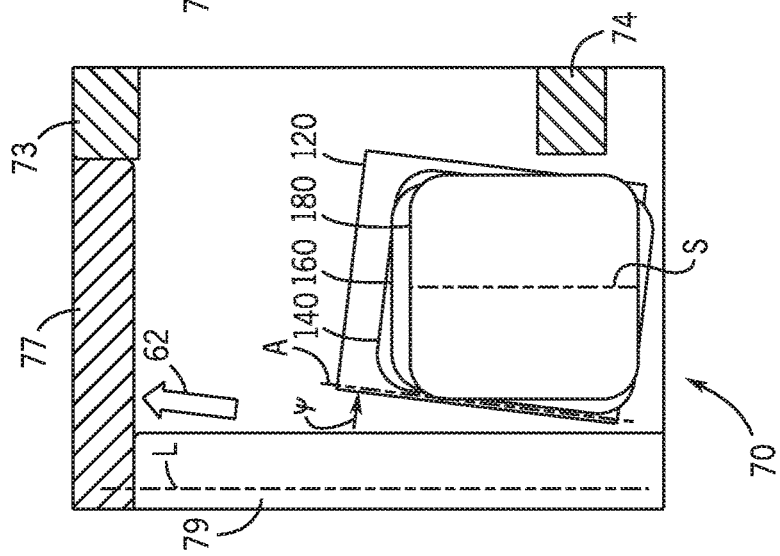

A first slide assembly 140 (also referred to as a "fore-aft slide assembly") is configured to move linearly relative to the adapter plate in parallel with the adapter plate longitudinal axis A and relative to the mounting assembly 120 (per arrow 62 in FIGS. 1A-1F). This first linear motion slides the seat's pivot mechanism into position to begin seat rotation away from the vehicle's central transmission tunnel 79 and toward the vehicle door 75 (between the A-pillar 73 and the B-pillar 74). A swivel assembly 160 has a swivel post that engages the fore-aft slide assembly 140 and controls rotation of the user seat relative to adapter plate axis A to pivot the seat around the B-pillar 74 (per arrow 64 in FIGS. 1A-1F). While the seat rotates, a second slide assembly 180 (also referred to as an "extension/retraction slide assembly") slides the seat linearly (per arrows 66 and 68 in FIGS. 1B and 1E) parallel to the user seat's axis S (referred to herein as the "seat axis S"), which may have pivoted so that it is not parallel to adapter plate axis A. As seen in FIGS. 1B and 1E, as the extension/retraction slide assembly 180 retracts the seat 102 (i.e., away from dashboard 77 and A-pillar 73) during rotation (and possibly during fore-aft movement along axis A as well), the legroom or knee room for a seat occupant increases substantially.

In FIGS. 1A-1F, the fore-aft slide assembly 140, swivel assembly 160 and extension/retraction slide assembly 180 coordinate the user seat movement in some implementations to increase or maximize an occupant's knee room (i.e., the spacing between an occupant's legs and the motor vehicle dashboard 77 and A-pillar 73) by reducing the user seat clearance T (i.e., the clearance between the user seat unit and the transmission tunnel 79) and the user seat clearance B (i.e., the clearance between the user seat unit and the B-pillar 74). This second linear movement can, in some implementations, include retracting the seat "back" from its original position (i.e., away from the dashboard 77, A-pillar 73, and/or B-pillar 74) by a distance R, as seen in FIGS. 1B and 1E.

Figure 2A:
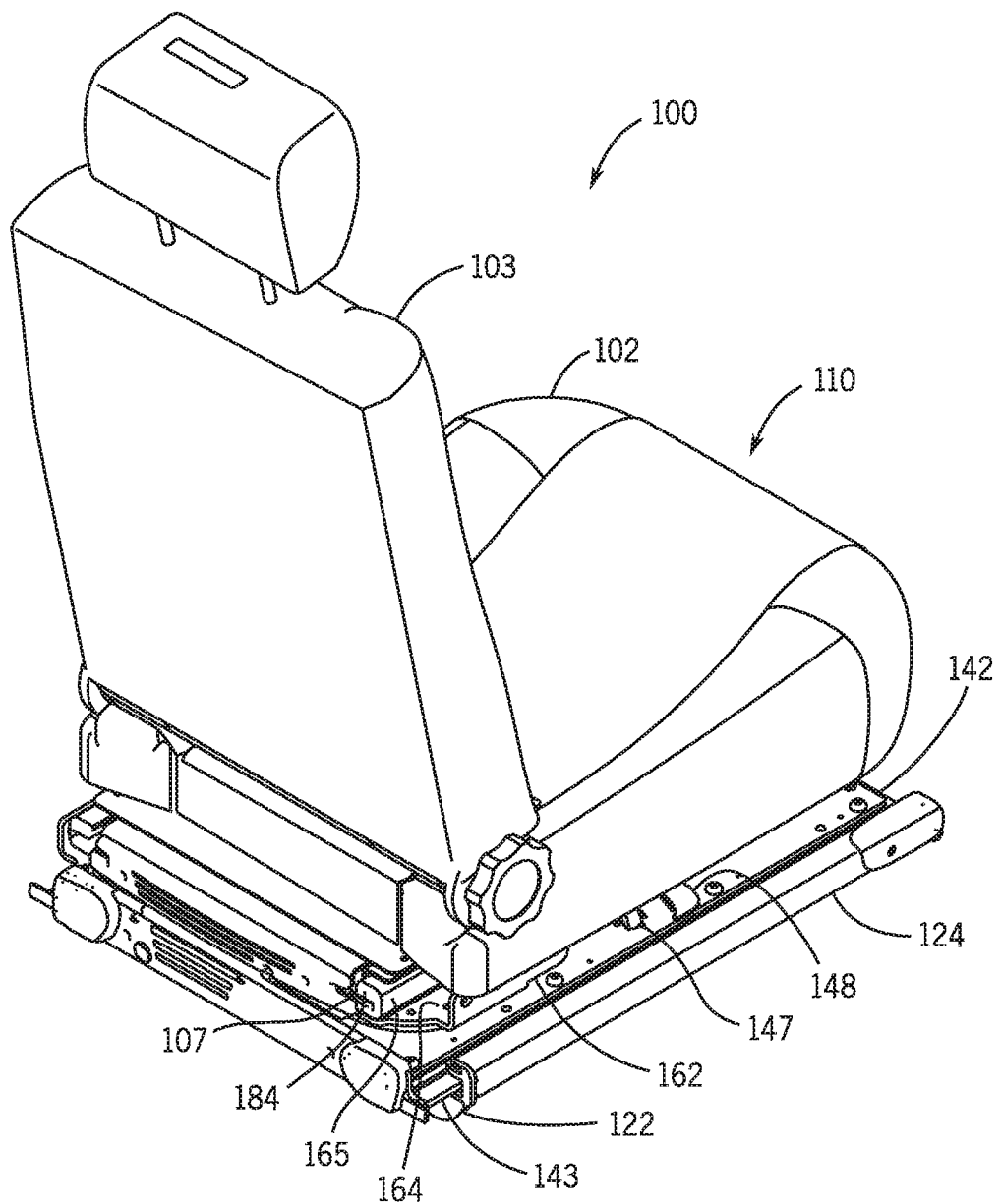

FIGS. 2A-2C illustrate a seating system 100 in various positions during its sequential operation including linear fore-aft movement parallel to static axis A as illustrated by arrow 129 and linear extension/retraction movement parallel to pivotable axis S as illustrated by arrow 189 in FIGS. 2B and 2C. Other components and movements (including rotation of the user seat unit 110) are discussed in more detail below. FIG. 2D shows the seating system 100 from several angles. The combination of multiple-axis linear movements and rotational movement permits multiple axis movement of the user seat. In each implementation of the seating system 100, the user seat moves through a transition corridor defined in the motor vehicle interior.

Stated another way, according to one or more implementations the user seat is moved from the drive position to the access position by coordinating the following movements of the seat: (1) linear movement along a first axis that is static relative to an adapter plate mounted within the motor vehicle (e.g., adapter plate axis A, as discussed in more detail herein); (2) rotating the seat relative to the static (first) axis; and (3) linear movement along a second axis that is pivotable, the second axis's orientation depending upon the amount of seat rotation (e.g., seat axis S, as discussed in more detail herein). During movement of the seat from between the drive position and the access position, occupant legroom can be increased by reducing or minimizing the clearance between the user seat and a motor vehicle B-pillar and by reducing or minimizing the clearance between the user seat and a motor vehicle transmission tunnel.

The Figures illustrate one or more implementations of an articulated seating system 100. Some such implementations can be viewed as a number of assemblies supporting a user seat unit 110 that can include a chair plate, seat pan and/or seat bracket 104 and associated mounted user seat cushion 102 (to which a backrest 103 and optional headrest may be mounted, if desired). The multiple assemblies can include a mounting assembly 120, a fore-aft slide assembly 140, a swivel assembly 160, and an extension/retraction slide assembly 180, where the assemblies work cooperatively to provide multiple-axis rotation and movement of the user seat unit 110. These various assemblies are driven and/or powered in some implementations by a drive packet that includes one or more motors, engines, actuators or the like for causing components, assemblies, etc. to move relative to one another. In some implementations, the swivel assembly 160 and extension/retraction assembly 180 operate in conjunction with the fore-aft slide assembly 140, combining two linear motions with rotation to maintain the user seat within predetermined thresholds with respect to (1) clearance T, the distance between the seat unit 110 and the motor vehicle transmission tunnel 79, and (2) clearance B, the distance between the seat unit 110 and the motor vehicle's B-pillar, both shown in FIGS. 1B and 1E, and thus providing substantial relative knee room for an occupant of the user seat during both egress from and ingress into the motor vehicle 70. One component of the occupant knee room is clearance K, seen in FIGS. 1B and 1E, which is the distance between the front edge of the swivel assembly 160 and a forward internal motor vehicle structure (e.g., either dashboard 77 or A-pillar 73 in FIGS. 1B and 1E). Because the extension/retraction assembly 180 allows seat 102 to retract away from the dashboard 77 and A-pillar 73 (retraction distance R in FIG. 1B), the total knee room for an occupant of seat 102 is the clearance K+R.

As noted, two types of linear motion are used in various vehicle access seat implementations. The first type of linear motion is linear motion of the first slide assembly parallel to static axis A and relative to the mounting assembly 120. The second type of linear motion is linear motion of the second slide assembly relative to the swivel assembly 160 and parallel to pivotable axis S (i.e., if the user seat 102 has rotated 90° from the adapter plate axis A, then the second type of linear motion will be on a line parallel to axis S, 90° off of axis A). Using a combination of these linear motions with rotation of the user seat unit 110 (such combinations can utilize sequential incremental movements and/or simultaneous movements of two or more of these), the user seat transmission tunnel clearance T and the user seat B-pillar clearance B can be minimized and/or maintained within specified thresholds until user seat 102 can be extended past the B-pillar to an access position in which seat 102 extends at least partially outside the door 75 of the motor vehicle 70. When this combination of motions is used, the user seat total clearance K+R is increased and, in some implementations, maximized. In addition to providing better comfort and use for an occupant of the seat 102, this also provides an improved clearance of the door 75 situated between the motor vehicle A-pillar and the B-pillar.

Figure 3A:
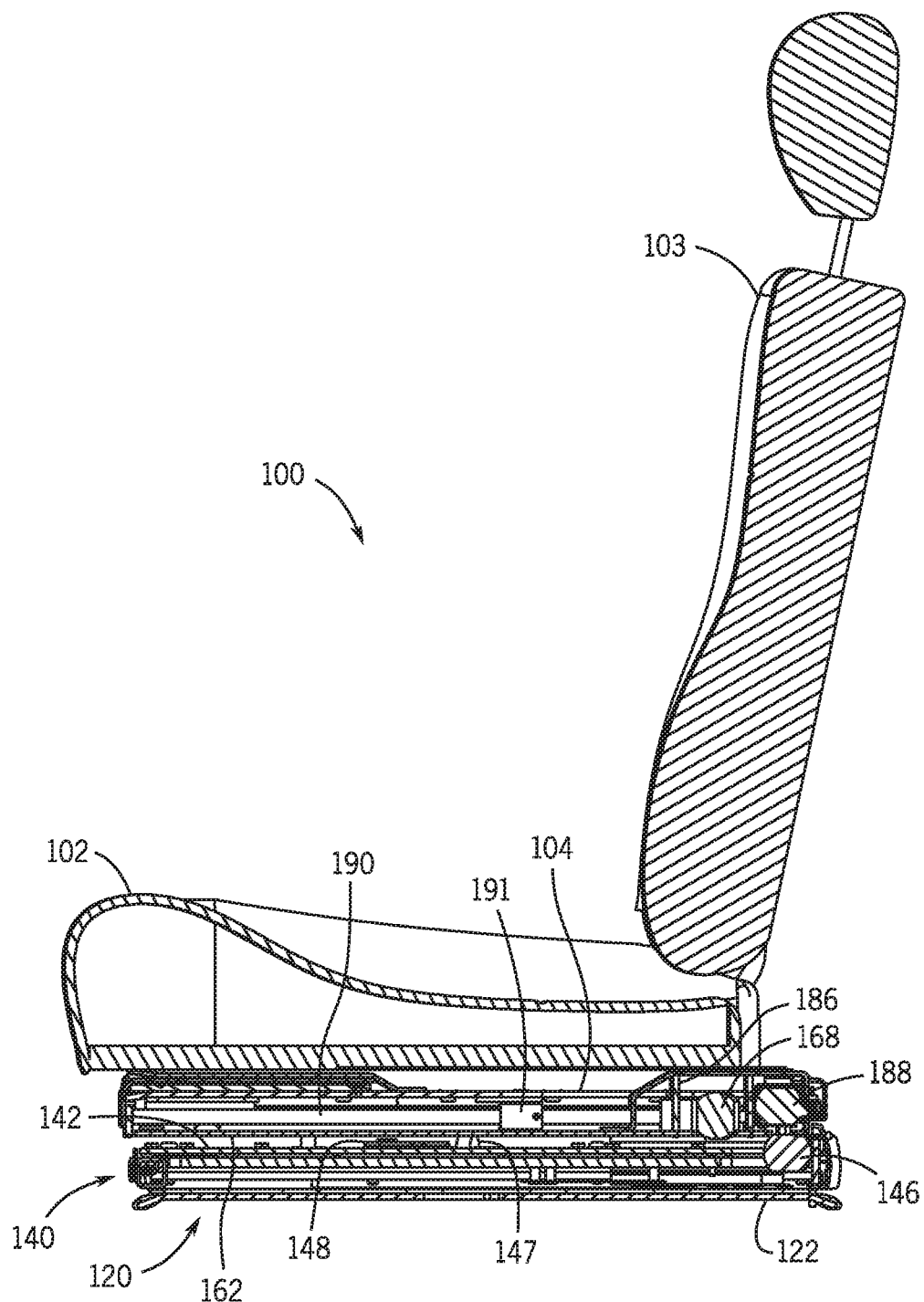
Figure 3B:
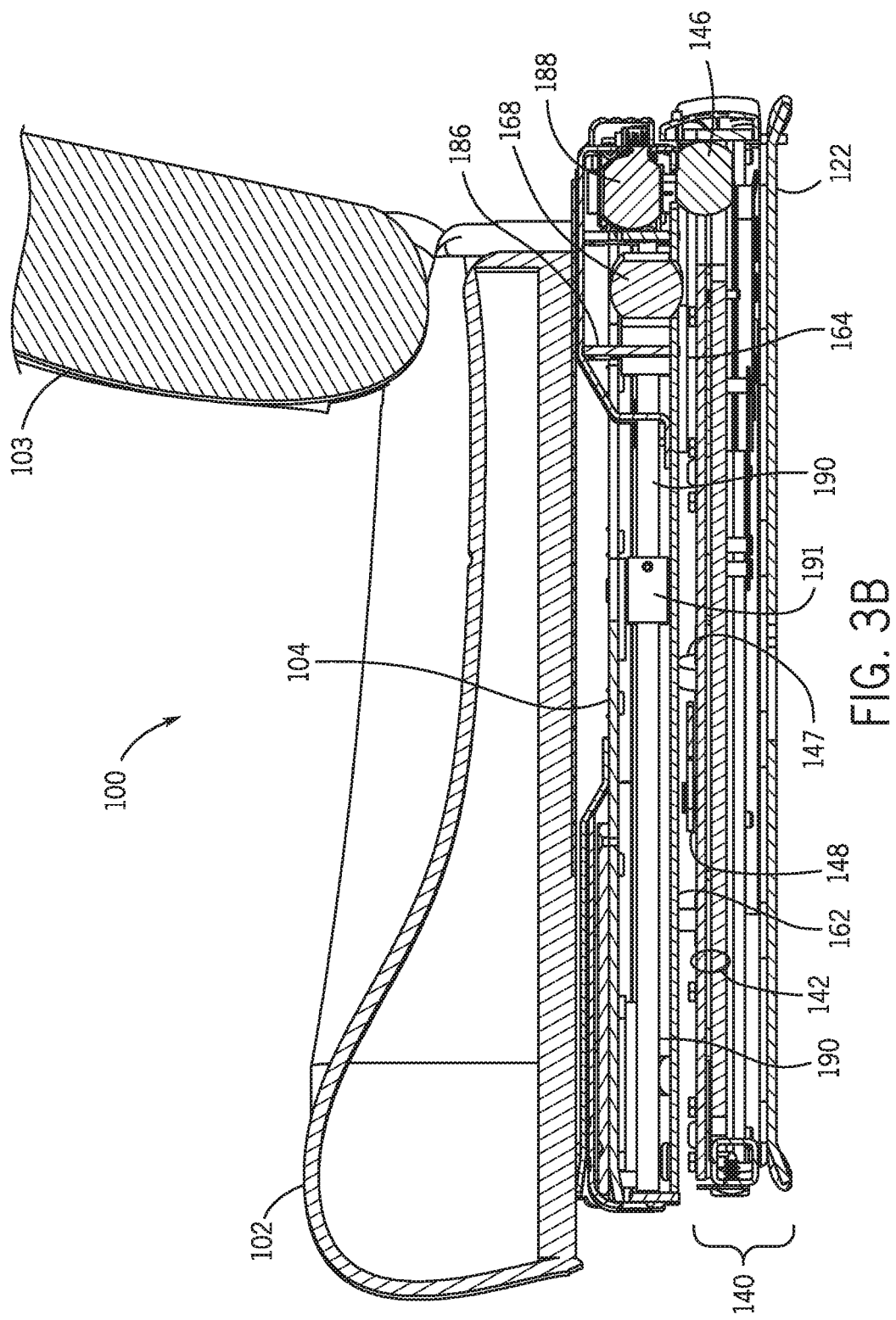
Figure 3C:
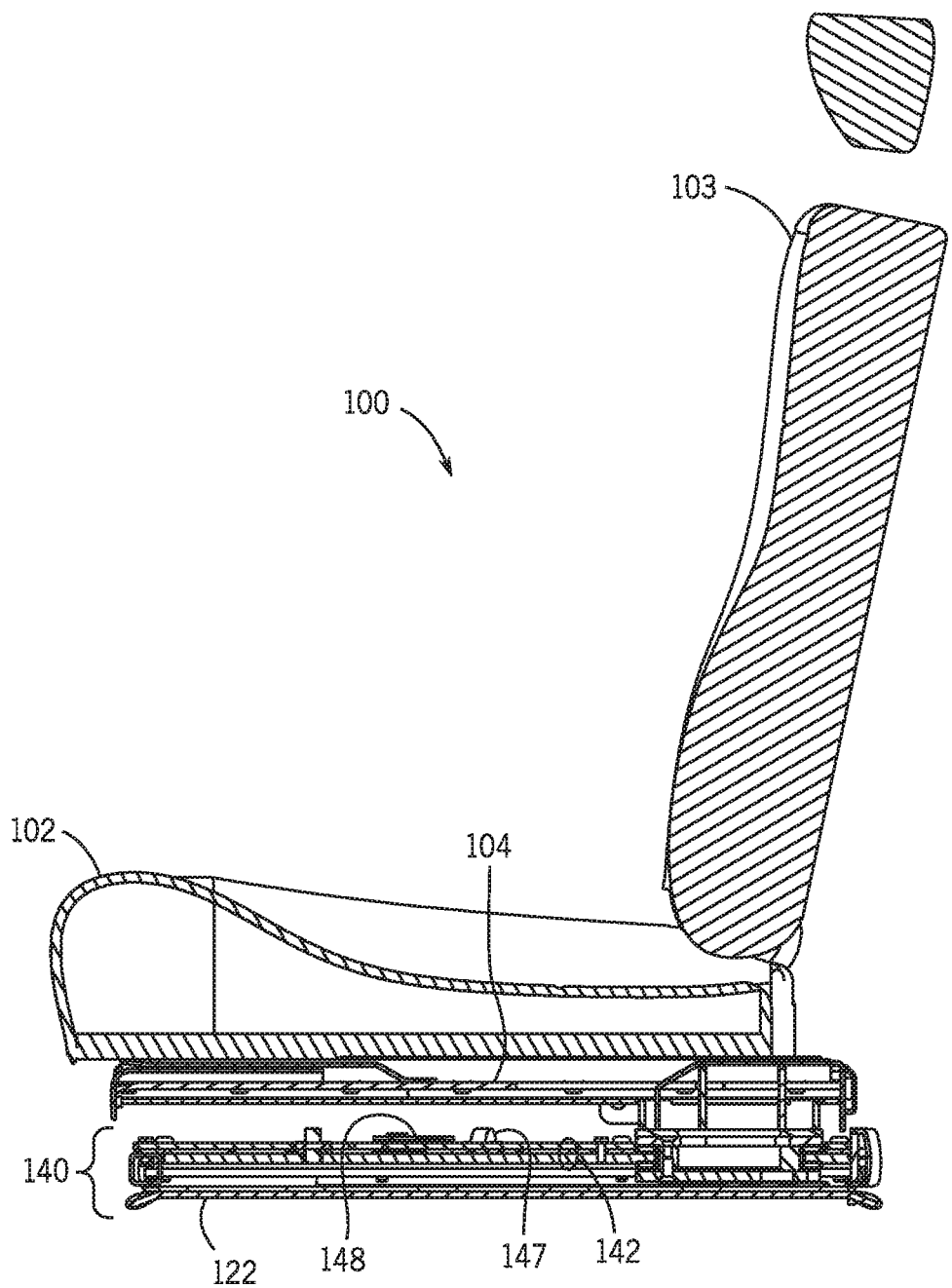
Figure 3E:
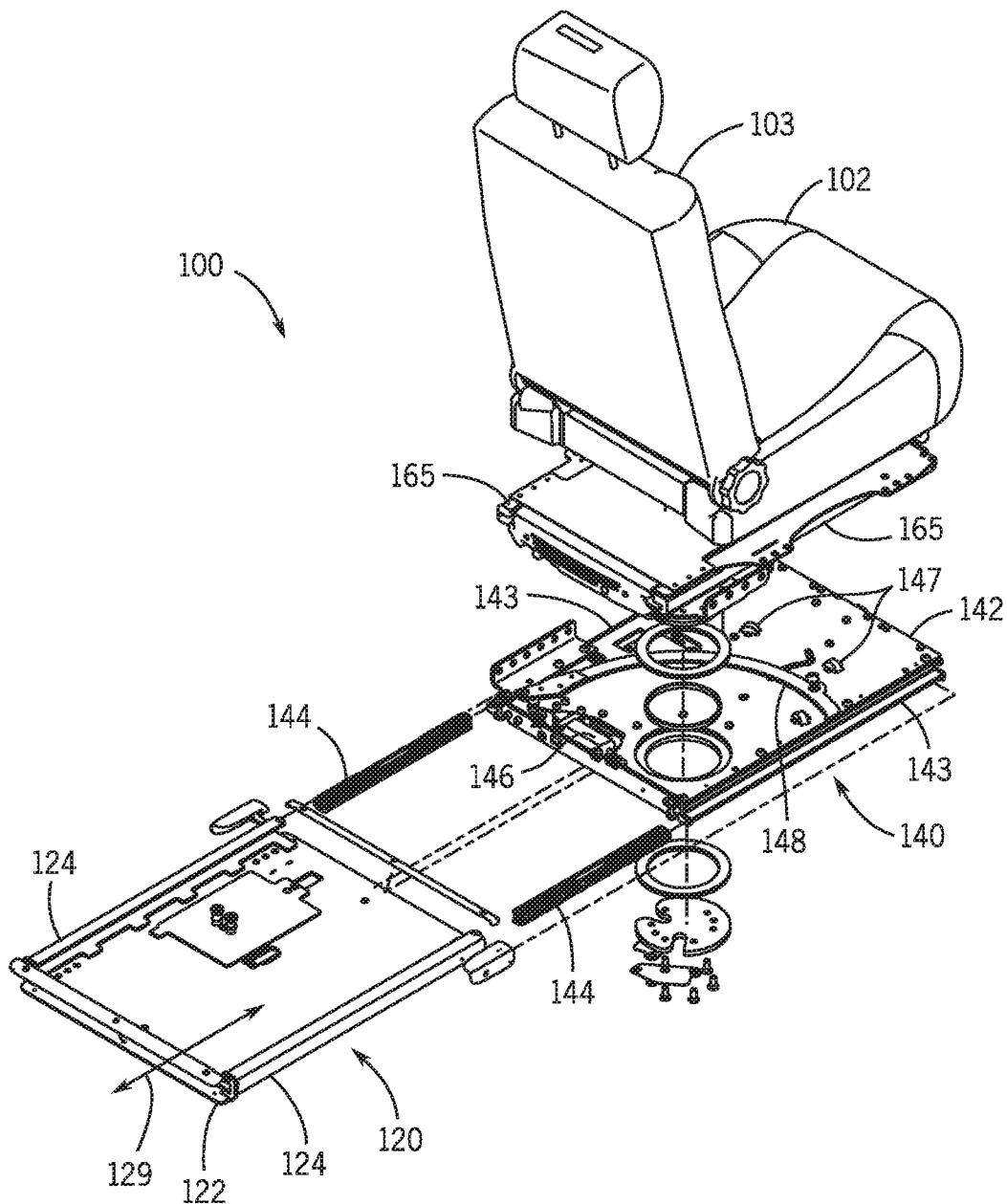
FIG. 3E is an exploded perspective view of one or more implementations of a vehicle access seating system.
Figure 5B:
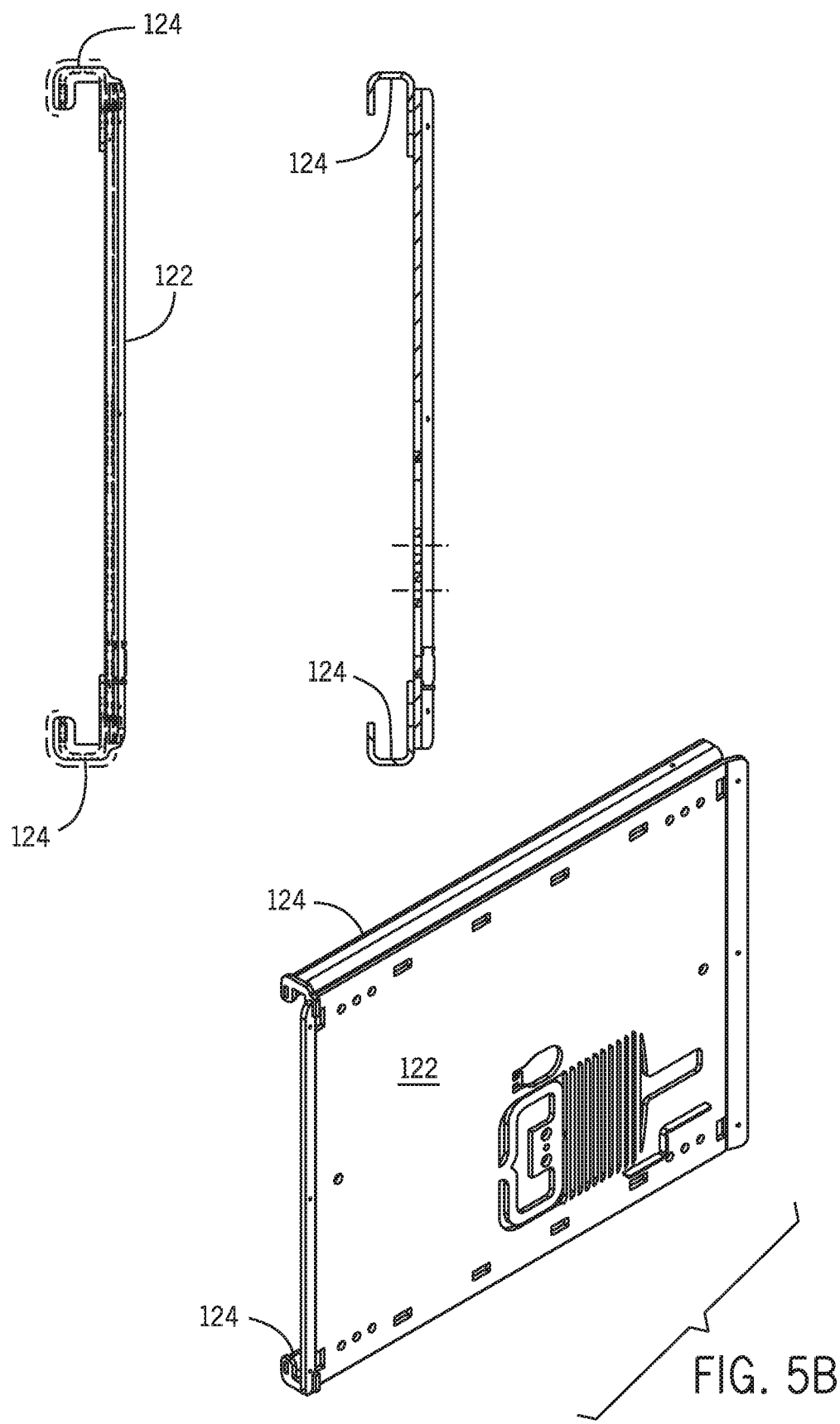

Adapter plate assembly 120 (also referred to as the "mounting assembly") is configured to be secured to a motor vehicle interior in approximately the same location as an OEM motor vehicle seat. As shown in FIGS. 5A and 5B, adapter plate assembly 120 has an adapter plate 122 configured to be affixed to a motor vehicle internal seat position adjacent to a motor vehicle door (e.g., being bolted to the motor vehicle chassis or secured in some other appropriate fashion and/or at other appropriate attachment points or structures) and has generally parallel fore-aft slide assembly sidewall roller bearing guides 144 (as seen in FIG. 3E) mounted within sidewall channels 124 to the lateral sides of adapter plate 122. These lateral sidewall channels 124 (which in some implementations are edges of adapter plate 122 that are bent or formed to create channels, reinforced if appropriate) in which roller bearing guides 144 are affixed that allow and guide the fore-aft slide assembly 140 to move linearly parallel to adapter plate axis A, as indicated by arrow 129 in FIG. 3E. Adapter plate assembly 120 serves as the base from which the other assemblies operate—the relative positioning and components of the assemblies can be seen in the cross-sectional views of FIGS. 3A-3D.

In some implementations, adapter plate 122 includes a crush zone 125 that is configured to absorb kinetic energy (and/or other forces) applied when a motor vehicle in which seating system 100 is mounted stops suddenly or otherwise generates forces that affect the mounting of adapter plate 122 to the motor vehicle. The crush zone 125 can be created using laser cutting of the plate 122, and/or in other ways known to those skilled in the art.

Figure 4A:
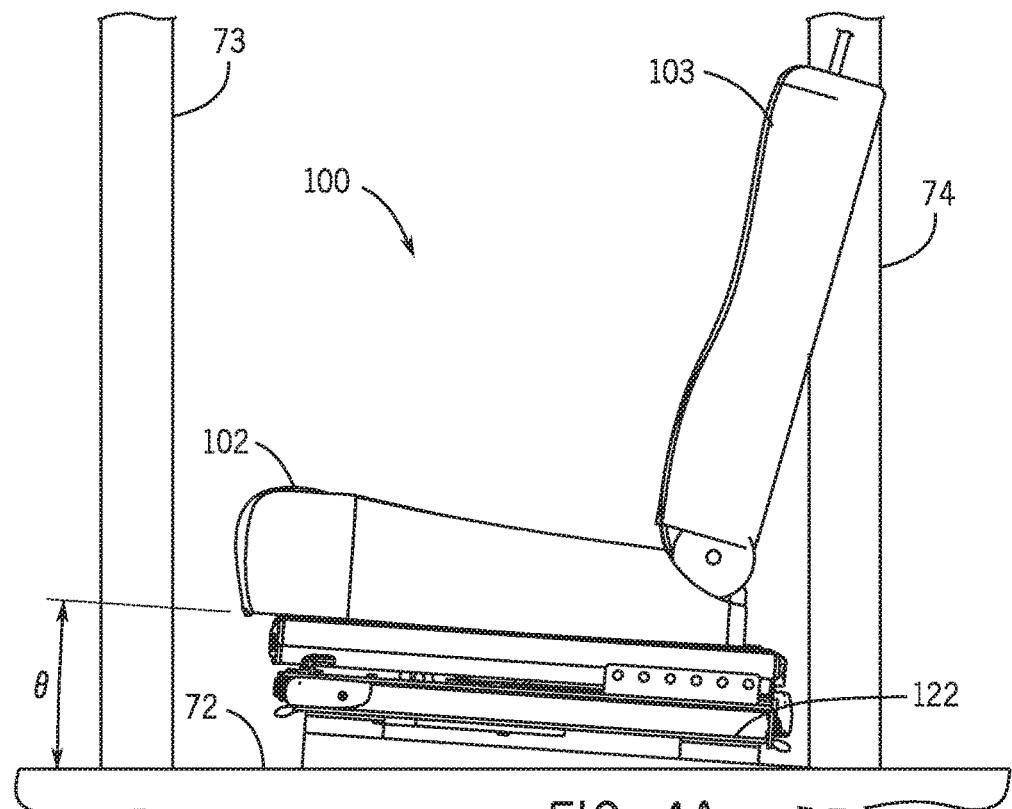
FIGS. 4A-4B are various views of a tilt mounting of a mounting assembly for a vehicle access seating system.

As seen in FIG. 4A, adapter plate 122 is mounted in some implementations as an inclined plane at an incline angle $\Theta$ (e.g., ~4°) relative to horizontal. In some implementations the adapter plate 122 is secured using vehicle adaptation brackets as an interface layer with the motor vehicle floor pan 72 designed with an "incline plane" of approximately 4° and an option to twist this layer sideways by a horizontal offset angle $\Psi$ (as noted above).

Figure 4B:
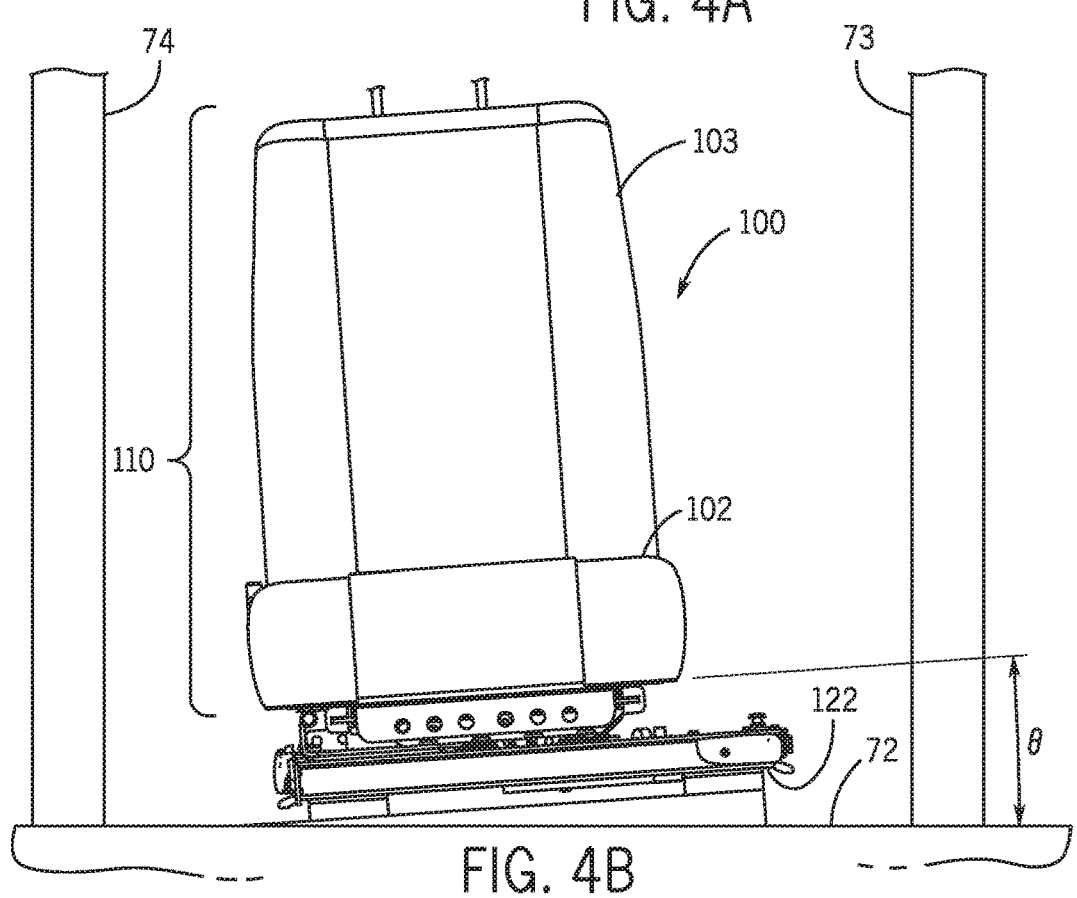

The inclined mounting provides improved occupant headroom in the motor vehicle (e.g., 2-3 inches in cases where $\Theta=4°$), which not only provides additional headroom in motor vehicles where such vehicle access seating systems can be installed now, but also means that other motor vehicles having lower ceilings can be retrofitted with such incline-mounted implementations, thus accommodating a wider variety of motor vehicles in which implementations disclosed herein can be employed. Also, occupant comfort is improved due to better leg relief and the ability of an occupant to recline further without slipping forward on the seat 102. In addition, when the seat unit 110 is rotated substantially (e.g., 90°), as seen in FIG. 4B, an occupant will have better doorway clearance because the occupant's head will be closer to the B-pillar as a result of the seat tilt (a motor vehicle's B-pillar typically provides the best headroom for individuals entering and exiting the motor vehicle). For seats installed in the driver's position in a motor vehicle, this tilt also improves the seat occupant's clearance of the steering wheel, which has been a limitation in some earlier seating systems. In implementations in which the seat is extended fully outside the motor vehicle, activation of the swivel assembly can provide a slight lift for the extended seat as well.

Figure 8:
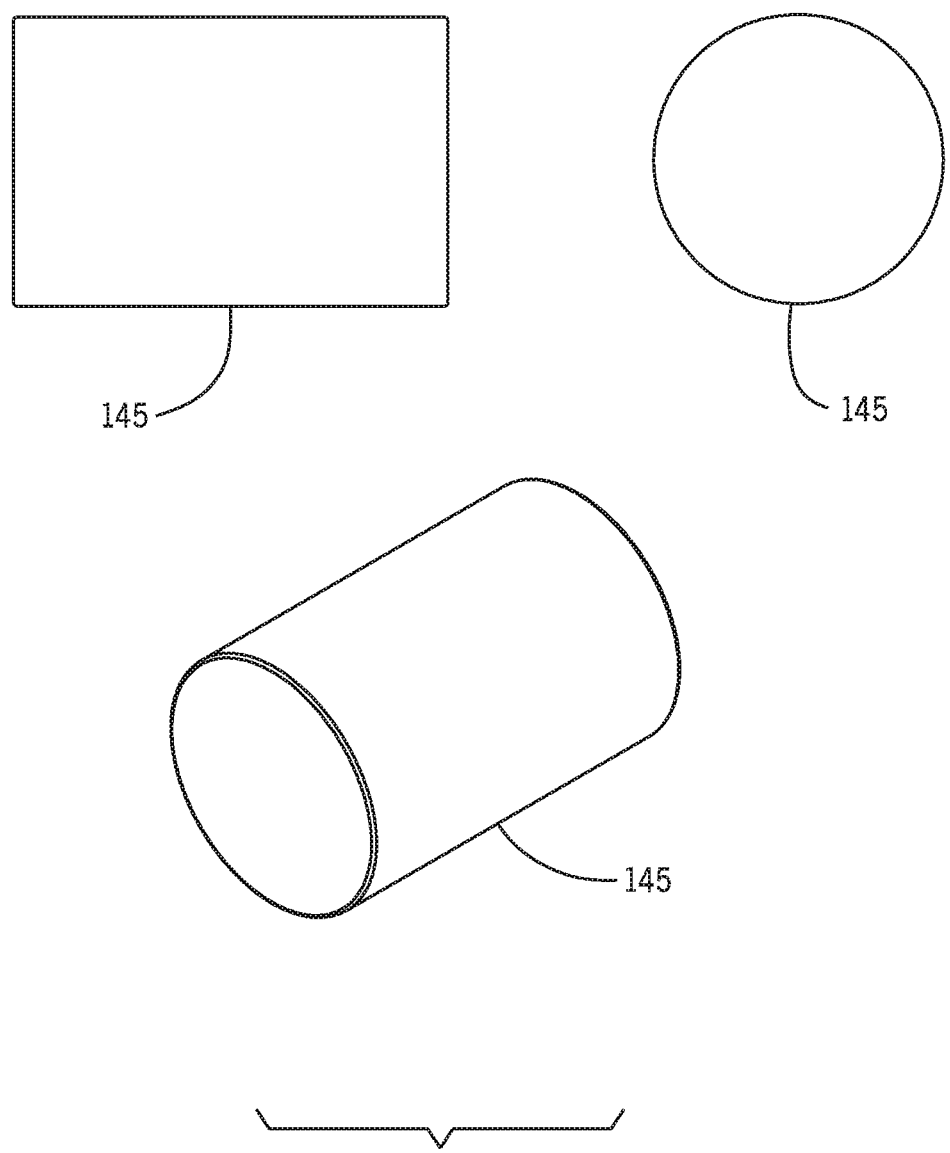

Fore-aft slide assembly 140 is configured to move the user seat linearly parallel to a static axis (e.g., adapter plate axis A) and relative to the fixed mounting assembly 120 to establish (and, in some implementations, optimize) the initial rotation position relative to the B-pillar 74. As illustrated in FIG. 6, this first slide assembly 140 uses an under-plate 142 having side edges 143, each of which engages one of the roller bearing side edge guides 144, thus allowing the under-plate 142 to slide linearly within the roller bearing side edge guides 144. As seen in more detail in FIGS. 7 and 8, each guide 144 can house roller bearings 145 on 3 orthogonal contact planes (top, outside, bottom) of each side edge guide 144. Each side edge 143 of under-plate 142 can thus engage each guide's top, bottom and outer edge roller bearings to provide both support and low-friction linear sliding translation of the under-plate 142 as it moves fore and aft relative to the adapter plate 122 during operation. Each side edge guide 144 can be formed of 2 halves that permit easy assembly and replacement of bearings 145 and the guides 144 themselves.

Figure 9:
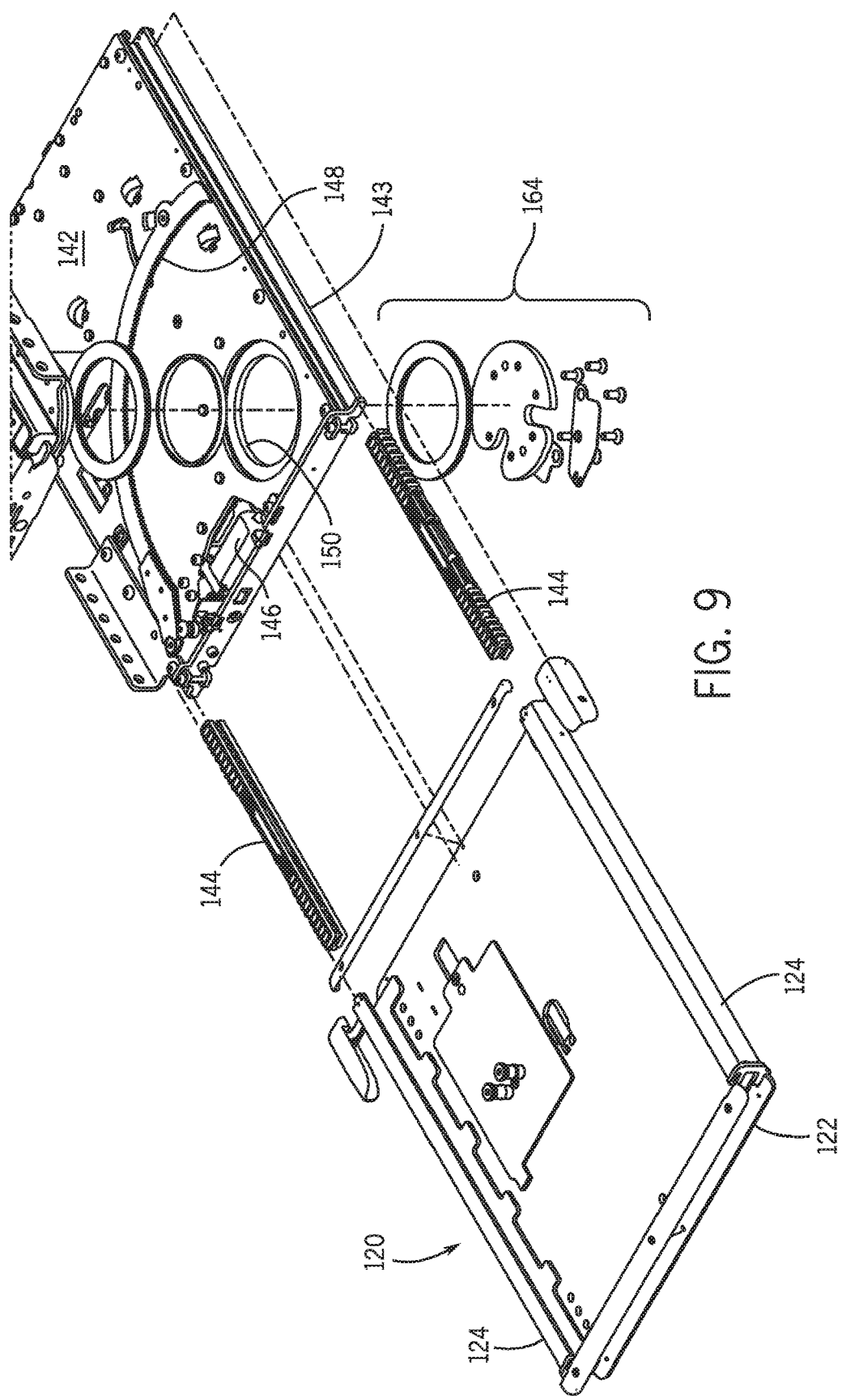
FIGS. 9-10 are various exploded views of one or more implementations of a vehicle access seating system.

Under-plate 142 can be unitary or can be composed of multiple plates sandwiched together to provide needed structure and/or support for system 100 and fore-aft slide assembly 140. Other equivalent sliding or linear motion structures may be known to those skilled in the art. Fore-aft linear motion is controlled by a drive motor 146 that engages adapter plate 122 and is mounted to under-plate 142, as shown in FIGS. 6 and 9.

An arcuate rack and pinion and swivel post configuration or other appropriate swivel mechanism can be used to control rotation of swivel assembly 160 relative to fore-aft slide assembly 140 in some implementations. To accomplish this, an arcuate rack 148 is mounted to the upper surface of under-plate 142, and a swivel or pivot hole 150 is generally concentric to rack 148. Hole 150 holds and/or supports a swivel post or similar structure of swivel assembly 160 during rotational movement, as explained in more detail herein.

Figure 10:
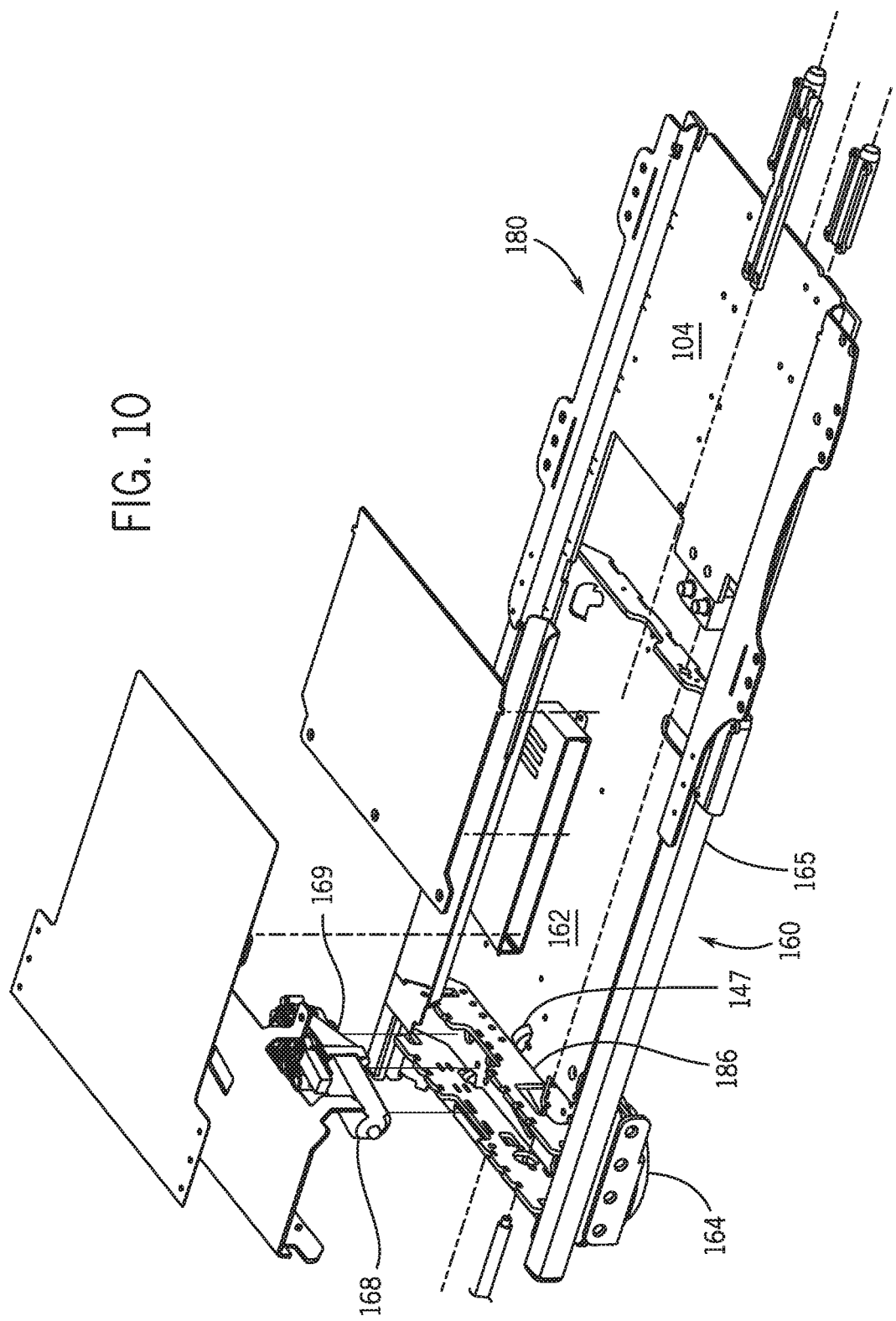

Swivel assembly 160 is mounted atop fore-aft slide assembly 140 and configured to rotate relative to the fore-aft slide assembly 140 using an off-center swivel assembly in some implementations. Swivel assembly 160 has an over-plate 162 affixed to a weldment or the like, depending upon the configuration used for a given seating system. As seen in FIGS. 10 and 11, over-plate 162 has a swivel post or other similar structure 164 mounted to the underside of over-plate 162. Structure 164 engages hole 150 of under-plate 142 to permit controlled rotation of the swivel assembly 160 relative to the fore-aft slide assembly 140. Pivoting of the swivel assembly 160 can be facilitated using one or more rollers 147 that are rotatably mounted to the under-plate 142 and/or the over-plate 162.

A swivel motor 168 (also referred to as a rotation motor) having a pinion 169 coupled thereto is mounted to over-plate 162 so that pinion 169 engages arcuate rack 148 on under-plate 142 to permit motor 168 to controllably rotate swivel assembly 160. This swivel motor 168 can be mounted to over-plate 162 using a back weldment 186 or other appropriate structure. Back weldment 186 also can be used to mount another drive motor 188 (also referred to as an "extension/retraction motor").

One or more implementations of back weldment 186 and motors 168, 188 are shown in FIGS. 3A-3D, 10 and 12. As will be appreciated by those skilled in the art, other equivalent drive packets using more or fewer motors, other components, etc. can be used.

Figure 11A:
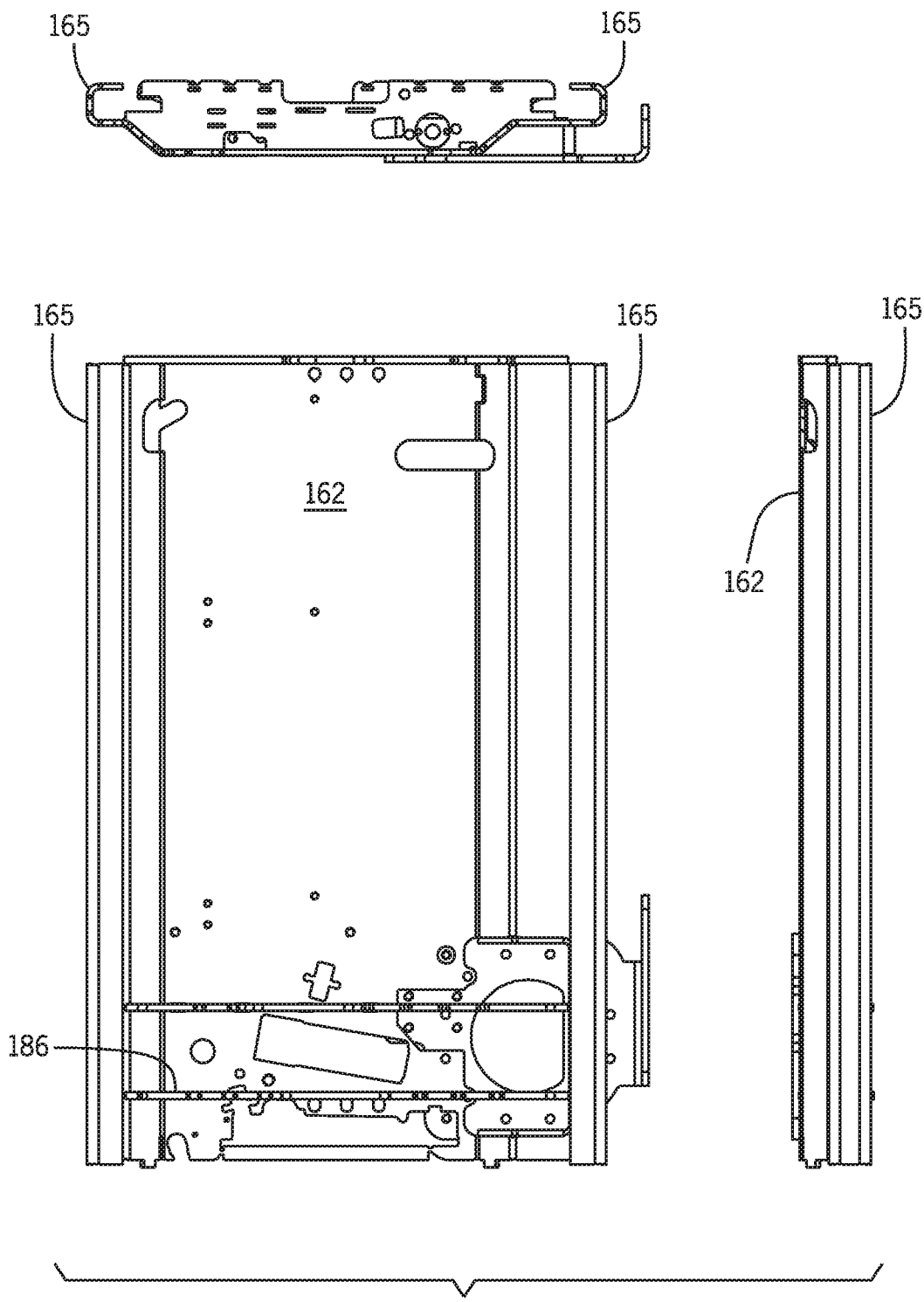
FIGS. 11A-11B are various views of all or part of a swivel assembly for one or more implementations of a vehicle access seating system.
Figure 11B:
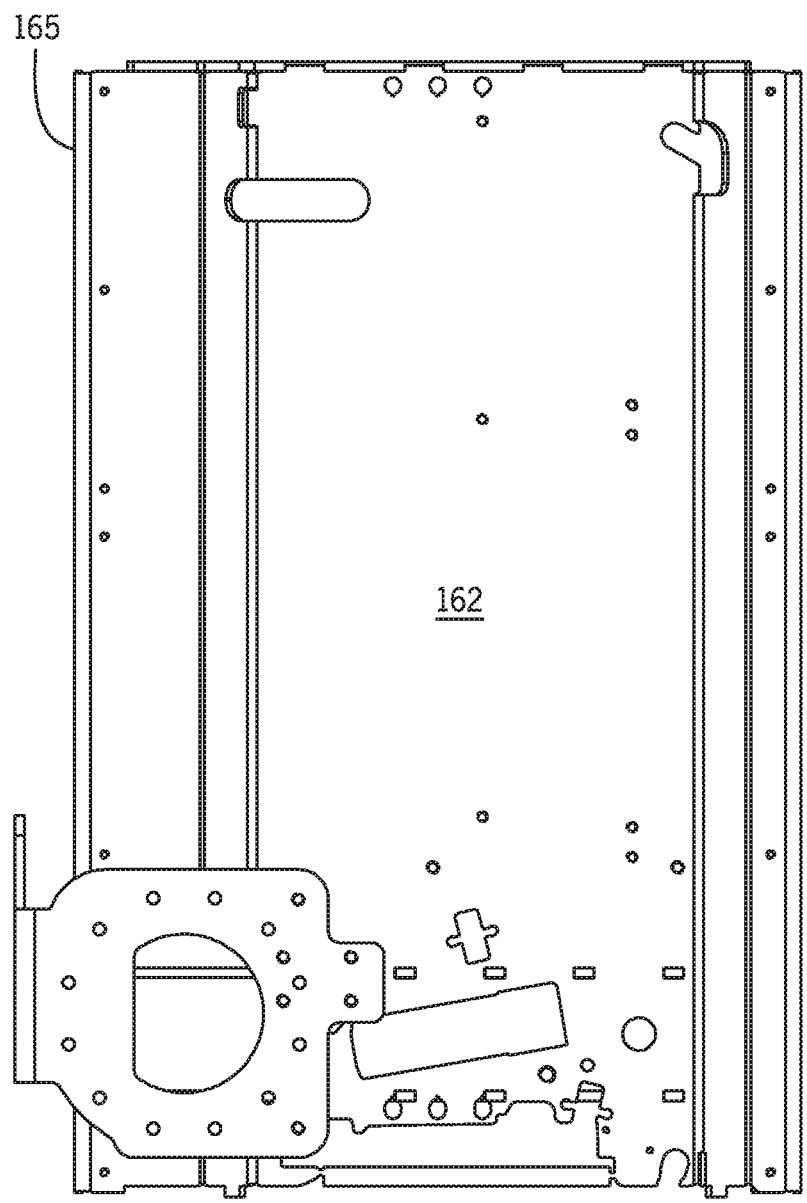

Swivel assembly 160 also includes sidewall channels 165 (which, like channels 124 of adapter plate 122, in some implementations are edges of the over-plate 162 that are bent or formed to create channels), as seen in FIGS. 10, 11A and 11B. Each channel 165 holds a runner or side edge guide 184, which can be a plastic rail made of self lubricated POM (polyoximetylen modified with Teflon additives).

Figure 12:
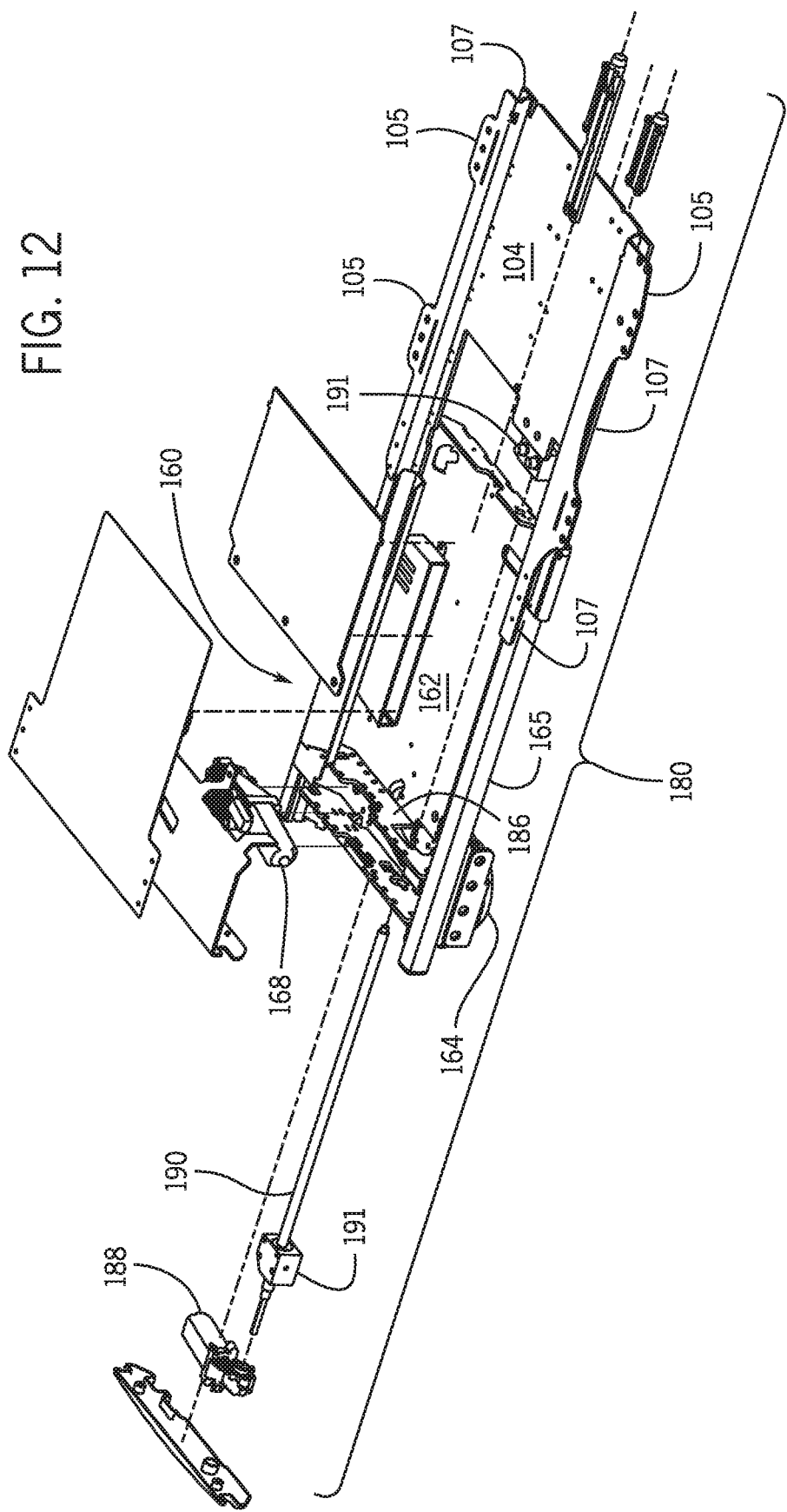
Figure 13:
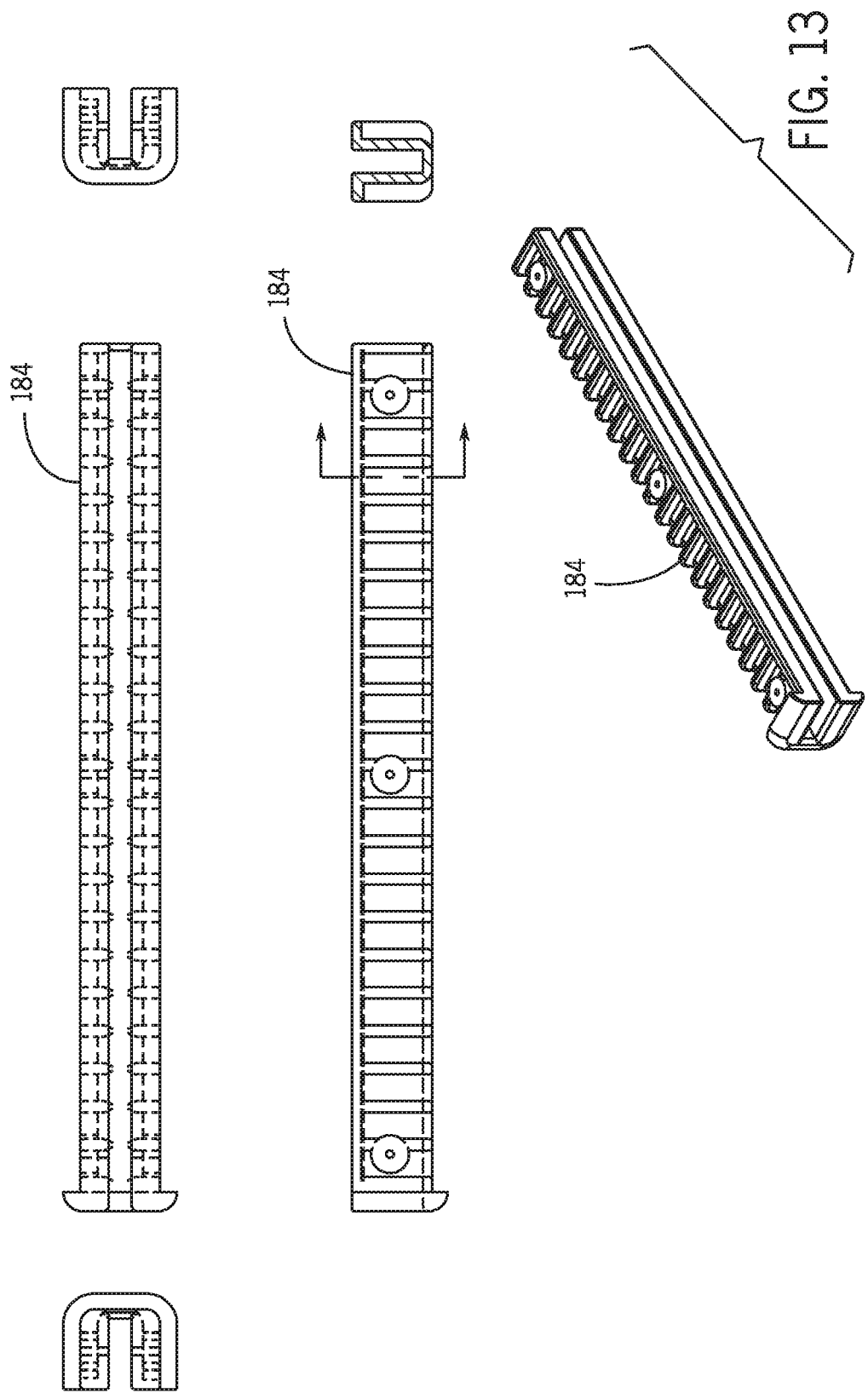
FIG. 13 illustrates various views of a runner or guide that can be used with a vehicle access seating system.
Figure 14A:
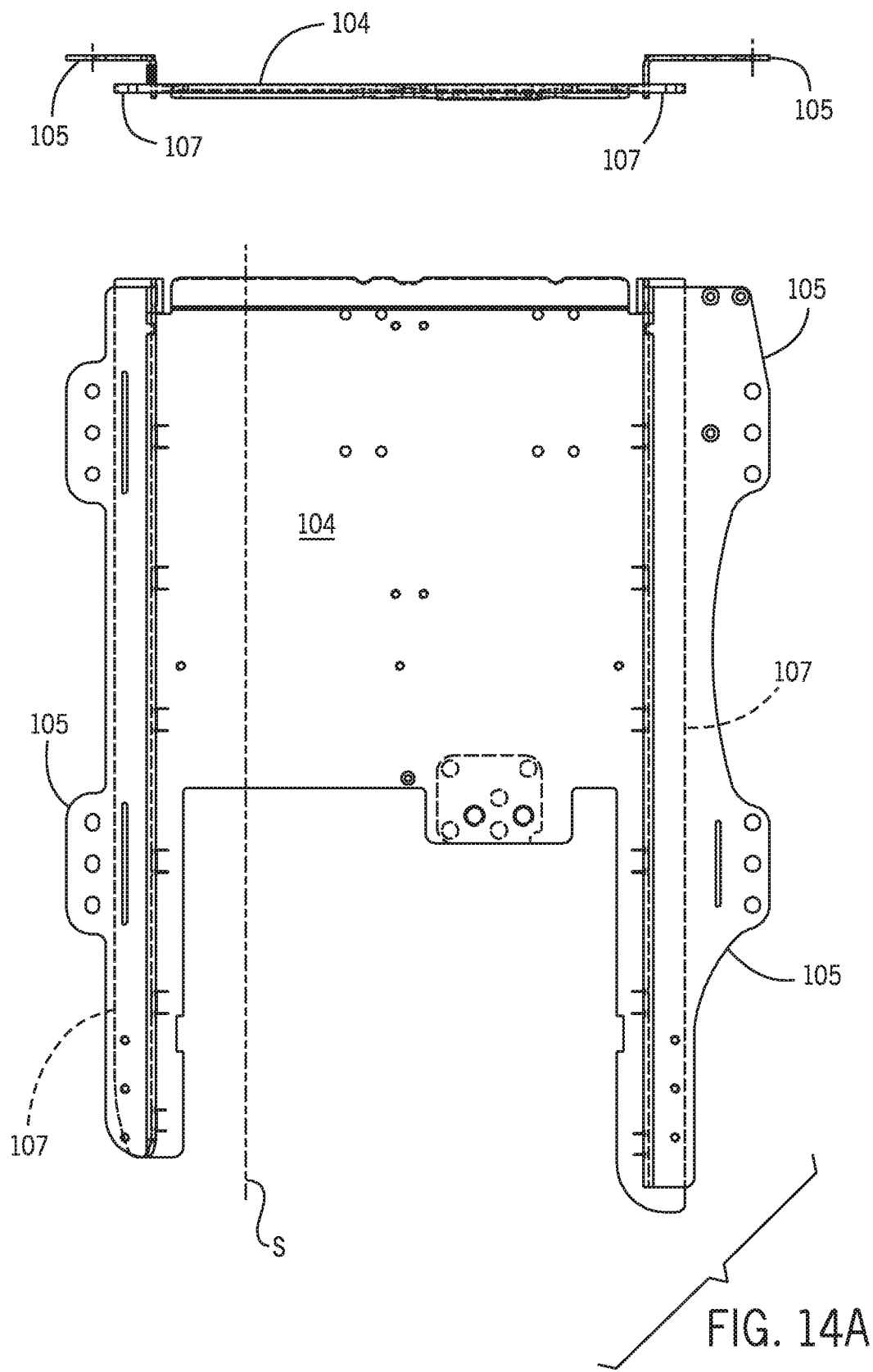
Figure 15:
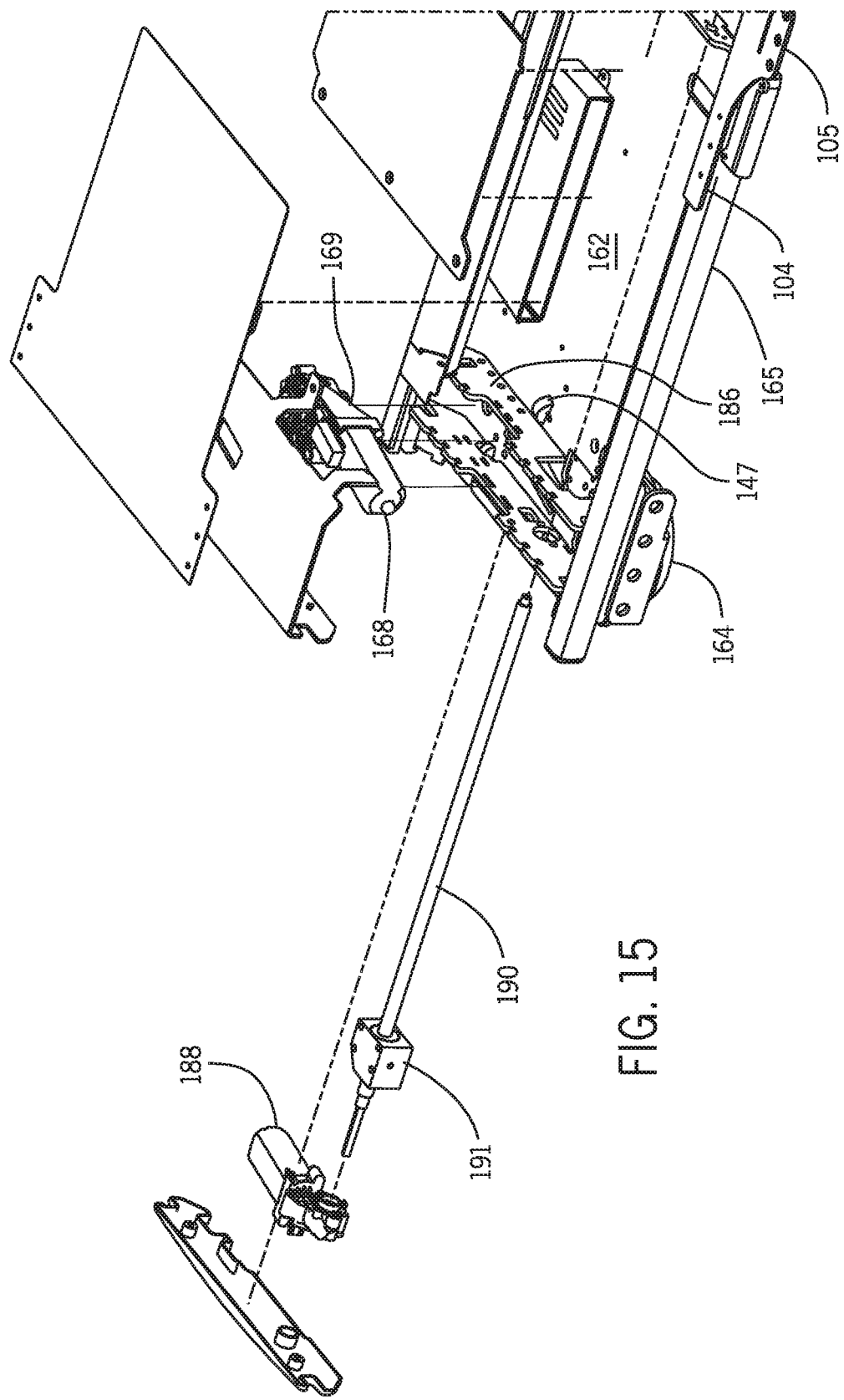

A seat pan movable as part of a second slide assembly 180 (also referred to as an "extension/retraction assembly") is mounted to the swivel assembly 160. As seen in FIGS. 12-15, extension/retraction slide assembly 180 includes a drive motor 188 mounted to the weldment 186, which drives a rod 190 that can utilize spacer apparatus 191 mounted at two locations on rod 190—as seen in FIGS. 12 and 15. This drive motor 188 thus engages the seat pan 104 to selectively move the second slide assembly 180 in a linear motion parallel to the axis S. Side edges 107 of seat pan 104 slidably engage side edge guides 184 held in the channels 165 of over-plate 162 to permit seat pan 104 to move linearly parallel to the seat axis S in both directions from the drive position of seat pan 104. User seat unit 110 includes seat cushion 102 mounted to seat pan 104 at seat mounting brackets 105.

In some implementations of the seating system 100, the fore-aft slide drive motor 146, swivel motor 168 and extension/retraction drive motor 188 can be selectively disengaged to permit manual operation of one or more aspects of system 100. Manual operation is selected by "unlocking" or "releasing" the motor from its powered connections to permit manual operation. This is particularly helpful when a seating system loses power and/or fails in some way, or when an individual motor is inoperable. For a motor vehicle in which the articulated seating system 100 is installed in the driver's location, failure of earlier seating systems other than in a drive position has previously meant that the motor vehicle was unusable. As is known in the art, a given motor can be operated using a hand crank or lever to move components as desired, including configuring system 100 to permit operation of a motor vehicle in which system 100 is installed. Geared connections and other mechanisms can be utilized to ensure proper synchronization and movement of components.

Using one or more implementations discussed herein and/or shown in the Figures, the vehicle access seating system 100 can be operated in one of a variety of methods of operations, including as follows. This example is based on but not limited to a passenger side front row installation (front right). Initially, the user seat unit 110 is in a "drive position" (see FIG. 1D and/or FIG. 2A) in which the seat axis S is generally parallel to adapter plate axis A, and where there is a small horizontal offset angle Ψ of ~1° between vehicle axis L and adapter plate axis A. Chair plate 104 is in a "neutral position" relative to the over-plate 162 (that is, the location of seat pan 104 relative to the swivel assembly 160 when the seating system 100 is in its "drive position"—meaning that the seat is in position to permit operation of the motor vehicle).

From this drive position the fore-aft assembly 140 slides user seat unit 110 (and swivel assembly 160 and extension/retraction assembly 180 which are mounted atop fore-aft assembly 140) parallel to static axis A. When the vehicle access seating system 100 is activated to provide occupant egress, the fore-aft assembly 140 positions the seat unit 110 for initiating rotation (that is, the seat 102 is going forward or rearward in the motor vehicle to the seat's "rotation start" position depending on the drive position). The fore-aft assembly 140 can be activated concurrent with the swivel assembly 160 to position the seat unit 110 as close to the B-pillar as possible (or within a preselected tolerance or distance—e.g., when sensors 78 control operation of one or more of the assemblies 140, 160, 180, the sensors may define the seat's position relative to the B-pillar 74 and the transmission tunnel 79).

Spacing K+R in FIGS. 1B and 1E represents the approximate legroom to the dashboard 77 and the A-pillar 73 (that spacing K+R is kept as large as possible in some implementations in order to increase legroom and knee clearance for a user seated in seat 102), while clearance B represents the distance to the B-pillar 74 (maintained as small as possible in implementations seeking to optimize seat rotation and user comfort/space). In some implementations, the seat unit 110 can also reverse (using extension/retraction assembly 180 and the resulting linear movement parallel to pivotable seat axis S), thus keeping clearance T relatively small between seat unit 110 and the transmission tunnel 79 and keeping the B-pillar clearance B relatively small, while simultaneously increasing spacing K+R as well. Seat 102 (and thus axis S) can be pivoted relative to axis A, and can be linearly moved forward or backward relative to the neutral position parallel to pivotable seat axis S. Legroom spacing K+R increases substantially using this multiple-axis movement.

The operation finishes with the seat 102 having rotated outboard approximately 90° (or another angle relative to the A axis that permits user ingress and egress) and extending out of the motor vehicle doorway in the user seat access position to permit easy egress, as seen in FIGS. 1C, 1F and/or 2C. Again, the travel path of seat unit 110 and the cooperative operation of assemblies 120, 140, 160 and 180 can be programmed for a given motor vehicle or can be defined using sensors 78 (attached to components of seating system 100 and/or to interior points in the motor vehicle 70, as seen in FIG. 1A) that provide spacing data to a control system 199 that then regulates operation of the drive package, drive system or drive train (that is, motors 146, 168 and 188 in some implementations). In implementations where the travel path of the user seat 102 is programmed, control system 199 can control the various motors and/or other components of system 100 and can be located anywhere convenient.

Implementations of seating system 100 are adaptable to and usable in motor vehicles having relatively small "transition corridors" as compared to earlier seating systems. For purposes of some of the implementations illustrated in this disclosure, a "transition corridor" can be defined as the spacing or travel path width between a motor vehicle's B-pillar and a forward obstacle or motor vehicle structure, such as the steering wheel, dashboard and/or A-pillar. Securing the user seat in the drive position can by implemented by using latches, locks and/or other mechanical means or the like to ensure that the user seat does not unintentionally move from the drive position (e.g., during operation of the motor vehicle by a driver occupying the user seat).

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents. The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described implementations should be taken as illustrative and not restrictive, and the invention should not be limited to the details given herein but should be defined by the following claims and their full scope of equivalents, whether foreseeable or unforeseeable now or in the future.

What is claimed is:

1. A vehicle seating system comprising:
a mounting assembly configured to be affixed to a motor vehicle internal seat position adjacent to a motor vehicle door, the mounting assembly comprising:
an adapter plate having a longitudinal axis A and defining a crush zone therein, the crush zone formed by removing material from the adapter plate proximate to a mount; and
a pair of first side edge guides, wherein each first side edge guide is mounted to a lateral side of the adapter plate;
wherein the axis A is static when the mounting assembly is mounted to a to motor vehicle internal seat position;
a first slide assembly coupled to the mounting assembly, wherein the first slide assembly is configured to move linearly relative to the adapter plate and parallel to the axis A, the slide assembly comprising:
an under-plate comprising a pair of first side edges, wherein each first side edge slidably engages one of the first side edge guides;
a rack mounted to the under-plate; and
a first slide assembly drive motor mounted to the under-plate and engaging the adapter plate to selectively move the first slide assembly in a linear motion parallel to the axis A;
a swivel assembly mounted to the first slide assembly, wherein the swivel assembly is configured to swivel relative to the first slide assembly, the swivel assembly comprising:
an over-plate;
a pair of second side edge guides, wherein each second side edge guide is mounted to a lateral side of the over-plate;
a swivel post mounted to the over-plate and rotatably engaging the first slide assembly; and
a swivel motor mounted to the over-plate, wherein the swivel motor comprises a pinion engaging the rack to selectively rotate the swivel assembly relative to the first slide assembly; and
a second slide assembly coupled to the swivel assembly, wherein the second slide assembly is configured to move linearly relative to the over-plate, the second slide assembly comprising:
a user seat unit comprising:
a seat pan having a longitudinal axis S;
a user seat cushion mounted to the seat pan; and
the seat pan comprising a pair of second side edges, wherein each second side edge slidably engages one of the second side edge guides;
wherein the axis S pivots when the swivel assembly rotates relative to the first slide assembly; and
a second slide assembly drive motor mounted to the over-plate and engaging the seat pan to selectively move the second slide assembly in a linear motion parallel to the axis S.

2. The seating system of claim 1 wherein the adapter plate is configured to be affixed to the motor vehicle at a horizontal offset angle relative to a longitudinal axis L of the motor vehicle.

3. The seating system of claim 2 wherein the adapter plate is configured to be affixed to the motor vehicle floor pan at an recline angle to increase occupant headroom.

4. The seating system of claim 1, further wherein the crush zone is defined formed laser cutting portions of the adapter plate proximate to the mount.

5. A vehicle access seating system comprising a user seat having an axis S, the vehicle access seating system further comprising:
an adapter plate having a longitudinal axis A and configured to be affixed to a motor vehicle seat position inside the motor vehicle generally between a motor vehicle transmission tunnel and a motor vehicle B-pillar;
a user seat fore-aft slide assembly slidably coupled to the adapter plate and configured to move the user seat linearly in a motor vehicle parallel to the axis A and relative to the adapter plate;
a user seat swivel assembly mounted to the fore-aft slide assembly, wherein the swivel assembly comprises an off-center swivel post and is configured to swivel the user seat relative to the adapter plate; and
a user seat extension/retraction assembly mounted to the swivel assembly and configured to move the user seat linearly parallel to the axis S and relative to the swivel assembly;
wherein the fore-aft slide assembly, swivel assembly and extension/retraction assembly are configured to move the user seat between an internal drive position in which the motor vehicle can be operated with an occupant in the user seat and an access position that is generally lateral to the drive position and in which the user seat extends at least partially outside the motor vehicle;
wherein the user seat, while moving between the drive position and the access position, provides increased legroom for an occupant seated in the user seat by reducing or minimizing the clearance between the user seat and the motor vehicle's B-pillar and by reducing or minimizing the clearance between the user seat and the motor vehicle's transmission tunnel;
wherein the adapter plate is configured to be affixed to the motor vehicle floor pan at a recline angle that is between about 1° and about 4° and configured to increase the headroom of an occupant in the user seat.

6. The seating system of claim 5, wherein the adapter plate is configured to be affixed to the motor vehicle at a horizontal offset angle of approximately 1° relative to the motor vehicle transmission tunnel and/or a longitudinal axis L of the motor vehicle.

7. The seating system of claim 6 wherein the fore-aft slide assembly, swivel assembly and extension/retraction assembly are configured to move the user seat using multiple axis movement as the user seat is rotated and moved linearly parallel to one or two axes, including the axis S that changes orientation relative to axis A as the seat is rotated using the swivel assembly.

8. The seating system of claim 5 wherein the fore-aft slide assembly comprises:
an under-plate;
a plurality of fore-aft sidewall roller bearing guides mounted to the adapter plate to guide linear movement of fore-aft slide assembly and the user seat relative to the adapter plate; and
a slide motor coupled to the under-plate and configured to move the under-plate linearly relative to the adapter plate.

9. The seating system of claim 8 wherein the swivel assembly comprises:
an over-plate;
a swivel motor mounted to a weldment secured to the swivel assembly;

a pinion coupled to the swivel motor, wherein the pinion engages an arcuate rack mounted to the under-plate; and the off-center swivel post mounted to the over-plate.

10. The seating system of claim 9 wherein the slide motor, the swivel motor and an extension/retraction motor each can be selectively operated manually to move the user seat to the drive position.

11. The seating system of claim 10 wherein the fore-aft slide assembly, the swivel assembly and the extension/retraction assembly work in concert to move the user seat through a transition corridor during movement between the drive position and the access position.

12. The seating system of claim 5 wherein movement of the user seat from the drive position to the access position is programmed.

13. The seating system of claim 5 wherein movement of the user seat from the drive position to the access position is determined based on one or more sensors in the motor vehicle that detect the user seat position relative to the B-pillar and the transmission tunnel.

14. The seating system of claim 5 wherein the seating system is installed in a motor vehicle.

15. The seating system of claim 5, further wherein the recline angle is about 4°.

16. The seating system of claim 5, further wherein the recline angle provides at least 2 inches of increased headroom for an occupant compared to a 0° recline angle.

17. In combination with a motor vehicle having a B-pillar, a forward seating compartment substantially forward of the B-pillar, a chassis, and a transmission tunnel extending longitudinally along a generally central longitudinal axis L of the motor vehicle, a vehicle access seating system comprising:
 a mounting assembly configured to be secured to a motor vehicle interior in approximately an OEM motor vehicle seat location, wherein the mounting assembly comprises an adapter plate bolted to the motor vehicle chassis and further comprises generally parallel fore-aft slide assembly sidewall roller bearing guides, wherein the adapter plate is mounted:
  at an recline angle of approximately 4° relative to an OEM motor vehicle seat to increase occupant headroom in the forward seating compartment; and
  at a horizontal outward offset angle of approximately 1° relative to the generally central longitudinal axis L so that a longitudinal axis A of the adapter plate is offset relative to the longitudinal axis L by the horizontal outward offset angle;
 a fore-aft slide assembly configured to move the user seat linearly parallel to the adapter plate axis A and relative to the mounting assembly, the fore-aft slide assembly comprising:
  an under-plate having sidewall edges, wherein each under-plate sidewall edge engages one of the roller bearing guides and further wherein the underplate having sidewall edges are configured to slide the under-plate linearly within the sidewall roller bearing guides, each roller bearing guide housing roller bearings on a top, outside and bottom portion of the corresponding roller bearing guide housing;
  a slide motor coupled to the under-plate and configured to selectively move the under-plate linearly in the sidewall roller bearing guides;
 an arcuate rack affixed to an under-plate upper surface; and
 an under-plate pivot hole generally concentric to the rack;
 a swivel assembly above the fore-aft slide assembly and engaging the fore-aft slide assembly, the swivel assembly comprising:
  an over-plate having a swivel post structure engaging the pivot hole to permit controlled rotation of the swivel assembly relative to the fore-aft slide assembly; and
  a swivel motor mounted to the over-plate, wherein the swivel motor comprises a pinion engaging the arcuate rack; and
 an extension/retraction assembly comprising a user seat mounted to a seat pan, wherein the user seat comprises an occupant orientation seat axis S, the extension/retraction assembly further comprising:
  the over-plate having generally parallel user seat extension/retraction sidewall guides;
  the seat pan having sidewall edges, wherein each seat pan sidewall edge engages one of the over-plate sidewall guides, wherein the seat pan is configured to slide linearly parallel to seat axis S within the extension/retraction user seat sidewall guides;
  a motor configured to move the user seat linearly parallel to the seat axis S relative to the over-plate;
 wherein the fore-aft slide assembly and swivel assembly move the user seat between a drive position in which the user seat is in a generally forward-facing orientation in the motor vehicle and an access position in which the user seat is facing generally outward and the user seat extends at least partially outside a motor vehicle doorway;
 further wherein one or more of the fore-aft slide assembly, the swivel assembly, and/or the extension/retraction assembly work cooperatively to move the user seat between the drive position and the access position while maximizing occupant legroom by reducing or minimizing the spacing between the user seat and the B-pillar and by reducing or minimizing the spacing between the user seat and the transmission tunnel.

18. The vehicle access seating system of claim 17, further wherein each sidewall edge of the under-plate engages each top, outside and bottom portion of the corresponding roller bearing guide housing.

* * * * *